United States Patent
Tallman et al.

(10) Patent No.: US 10,508,553 B2
(45) Date of Patent: Dec. 17, 2019

(54) COMPONENTS HAVING SEPARABLE OUTER WALL PLUGS FOR MODULATED FILM COOLING

(71) Applicant: General Electric Company, Schenectady, NY (US)

(72) Inventors: James Albert Tallman, Scotia, NY (US); Stephen Rutkowski, Duanesburg, NY (US)

(73) Assignee: General Electric Company, Schenectady, NY (US)

( * ) Notice: Subject to any disclaimer, the term of this patent is extended or adjusted under 35 U.S.C. 154(b) by 480 days.

(21) Appl. No.: 15/367,939

(22) Filed: Dec. 2, 2016

(65) Prior Publication Data
US 2018/0156039 A1    Jun. 7, 2018

(51) Int. Cl.
| | |
|---|---|
| *F01D 5/18* | (2006.01) |
| *F01D 9/06* | (2006.01) |
| *F01D 25/12* | (2006.01) |
| *F02C 3/14* | (2006.01) |

(Continued)

(52) U.S. Cl.
CPC ............. *F01D 5/186* (2013.01); *F01D 5/189* (2013.01); *F01D 9/065* (2013.01); *F01D 25/12* (2013.01); *F02C 3/14* (2013.01); *F02C 7/16* (2013.01); *F01D 5/288* (2013.01); *F05D 2240/35* (2013.01); *F05D 2260/202* (2013.01); *F05D 2300/171* (2013.01); *F05D 2300/174* (2013.01); *F05D 2300/175* (2013.01)

(58) Field of Classification Search
CPC .......... F01D 5/186; F01D 5/187; F01D 5/188; F01D 5/189; F01D 5/288; F01D 5/147; F01D 9/065; F05D 2260/202
See application file for complete search history.

(56) References Cited

U.S. PATENT DOCUMENTS

| | | | |
|---|---|---|---|
| 5,269,653 A | * | 12/1993 | Evans ..................... F01D 5/186 415/115 |
| 6,039,537 A | * | 3/2000 | Scheurlen ............... F01D 5/186 415/115 |
| 6,375,425 B1 | | 4/2002 | Lee et al. |

(Continued)

FOREIGN PATENT DOCUMENTS

| | | |
|---|---|---|
| EP | 1375825 A1 | 1/2004 |
| EP | 1669545 A1 | 6/2006 |

*Primary Examiner* — Dwayne J White
*Assistant Examiner* — Behnoush Haghighian
(74) *Attorney, Agent, or Firm* — Armstrong Teasdale LLP

(57) ABSTRACT

A component includes an outer wall that includes an exterior surface and an opposite interior surface. The component also includes at least one internal void defined adjacent the interior surface and configured to receive a cooling fluid therein. The component further includes a plurality of openings defined in and extending through the outer wall such that the outer wall defines an edge of each of the plurality of openings. Additionally, the component includes a plurality of separable plugs each positioned in a corresponding opening. Each of the separable plugs is sized to fit within the corresponding opening such that a clearance gap is defined between the separable plug and the edge of the corresponding opening. Each of the separable plugs is coupled to the outer wall by at least one tab that extends across the clearance gap from the each separable plug to the edge of the corresponding opening.

20 Claims, 10 Drawing Sheets

(51) Int. Cl.
*F02C 7/16* (2006.01)
*F01D 5/28* (2006.01)

(56) References Cited

U.S. PATENT DOCUMENTS

| | | | |
|---|---|---|---|
| 6,454,156 B1* | 9/2002 | Taras, Jr. | B23K 20/16 228/119 |
| 6,749,396 B2* | 6/2004 | Barry | F01D 5/186 415/115 |
| 7,909,581 B2 | 3/2011 | Klein | |
| 9,718,735 B2* | 8/2017 | Delvaux | C04B 35/565 |
| 2003/0108424 A1* | 6/2003 | Masaki | C23C 4/00 416/97 R |
| 2004/0226682 A1* | 11/2004 | Ehrhard | F01D 5/18 165/11.1 |
| 2006/0263217 A1* | 11/2006 | Spanks, Jr. | F01D 5/186 416/97 R |
| 2007/0036942 A1* | 2/2007 | Steele | F01D 25/12 428/131 |
| 2008/0226871 A1* | 9/2008 | Klein | C23C 14/042 428/138 |
| 2008/0298975 A1 | 12/2008 | James et al. | |
| 2009/0074576 A1* | 3/2009 | Brostmeyer | F01D 5/186 416/95 |
| 2010/0239409 A1* | 9/2010 | Draper | F01D 5/005 415/1 |
| 2010/0239412 A1* | 9/2010 | Draper | F01D 5/186 415/115 |
| 2011/0189015 A1 | 8/2011 | Shepherd | |
| 2013/0104517 A1* | 5/2013 | Correia | F01D 5/18 60/39.091 |
| 2014/0099183 A1* | 4/2014 | Morgan | F01D 5/18 415/1 |
| 2014/0166255 A1* | 6/2014 | Bogue | F02C 7/12 165/168 |
| 2014/0174092 A1* | 6/2014 | Bogue | B05D 7/22 60/754 |
| 2015/0198062 A1* | 7/2015 | Morgan | F01D 5/186 415/1 |

* cited by examiner

COMPONENTS HAVING SEPARABLE OUTER WALL PLUGS FOR MODULATED FILM COOLING

BACKGROUND

The field of the disclosure relates generally to components that include internal cooling conduits, and more particularly to components that include an array of separable plugs on an outer wall to facilitate modulated film cooling.

Some components, such as hot gas path components of gas turbines, are subjected to high temperatures. At least some such components have internal cooling conduits defined therein, such as but not limited to a network of plenums and passages, that circulate a cooling fluid internally, for example, along an interior surface of the outer wall of the component. In addition, at least some such components include a thermal bond coat on an exterior surface of the outer wall. The thermal bond coat and cooling fluid each facilitate maintaining the outer wall below a threshold temperature during operation. In at least some cases, local regions of the thermal bond coat can be become spalled or otherwise damaged over an operating lifetime of the component, and an increased flow rate of the cooling fluid is selected to compensate for the potential loss of protection from the thermal bond coat in spalled regions. However, for at least some components, the increased cooling fluid flow must be provided to the entire component, rather than just the spalled regions, resulting in unnecessary overcooling of unspalled regions and decreased operating efficiency.

BRIEF DESCRIPTION

In one aspect, a component is provided. The component includes an outer wall that includes an exterior surface and an opposite interior surface. The component also includes at least one internal void defined adjacent the interior surface and configured to receive a cooling fluid therein. The component further includes a plurality of openings defined in and extending through the outer wall such that the outer wall defines an edge of each of the plurality of openings. Additionally, the component includes a plurality of separable plugs each positioned in a corresponding opening of the plurality of openings. Each of the separable plugs is sized to fit within the corresponding opening such that a clearance gap is defined between the separable plug and the edge of the corresponding opening. Each of the separable plugs is coupled to the outer wall by at least one tab that extends across the clearance gap from the each separable plug to the edge of the corresponding opening.

In another aspect, a rotary machine is provided. The rotary machine includes a combustor section configured to generate combustion gases, and a turbine section configured to receive the combustion gases from the combustor section and produce mechanical rotational energy therefrom. A path of the combustion gases through the rotary machine defines a hot gas path. The rotary machine also includes a component proximate the hot gas path. The component includes an outer wall that includes an exterior surface and an opposite interior surface. The component also includes at least one internal void defined adjacent the interior surface and configured to receive a cooling fluid therein. The component further includes a plurality of openings defined in and extending through the outer wall such that the outer wall defines an edge of each of the plurality of openings. Additionally, the component includes a plurality of separable plugs each positioned in a corresponding opening of the plurality of openings. Each of the separable plugs is sized to fit within the corresponding opening such that a clearance gap is defined between the separable plug and the edge of the corresponding opening. Each of the separable plugs is coupled to the outer wall by at least one tab that extends across the clearance gap from the each separable plug to the edge of the corresponding opening.

DRAWINGS

Figure 11:
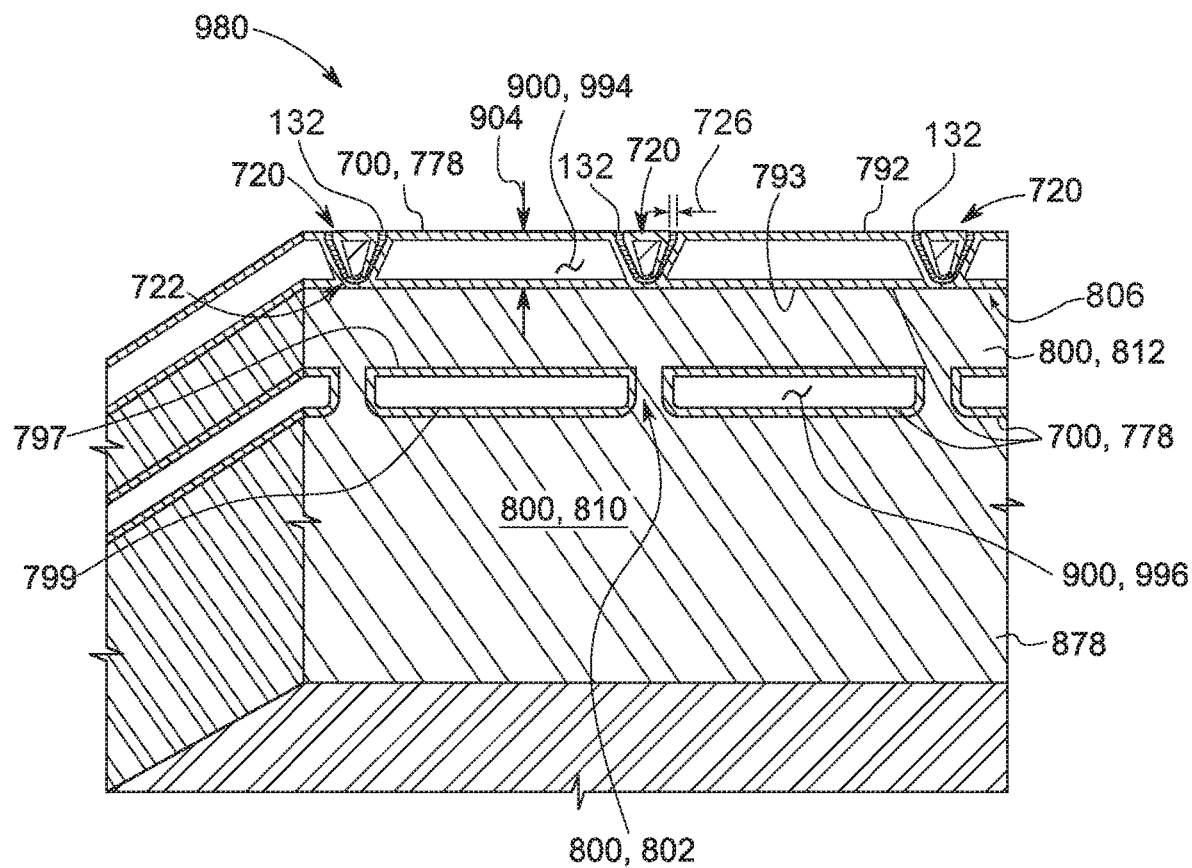
FIG. 11 is a schematic perspective sectional view of a portion of an exemplary jacketed core that may be formed from the exemplary jacketed precursor component shown in FIG. 10.
Figure 12:
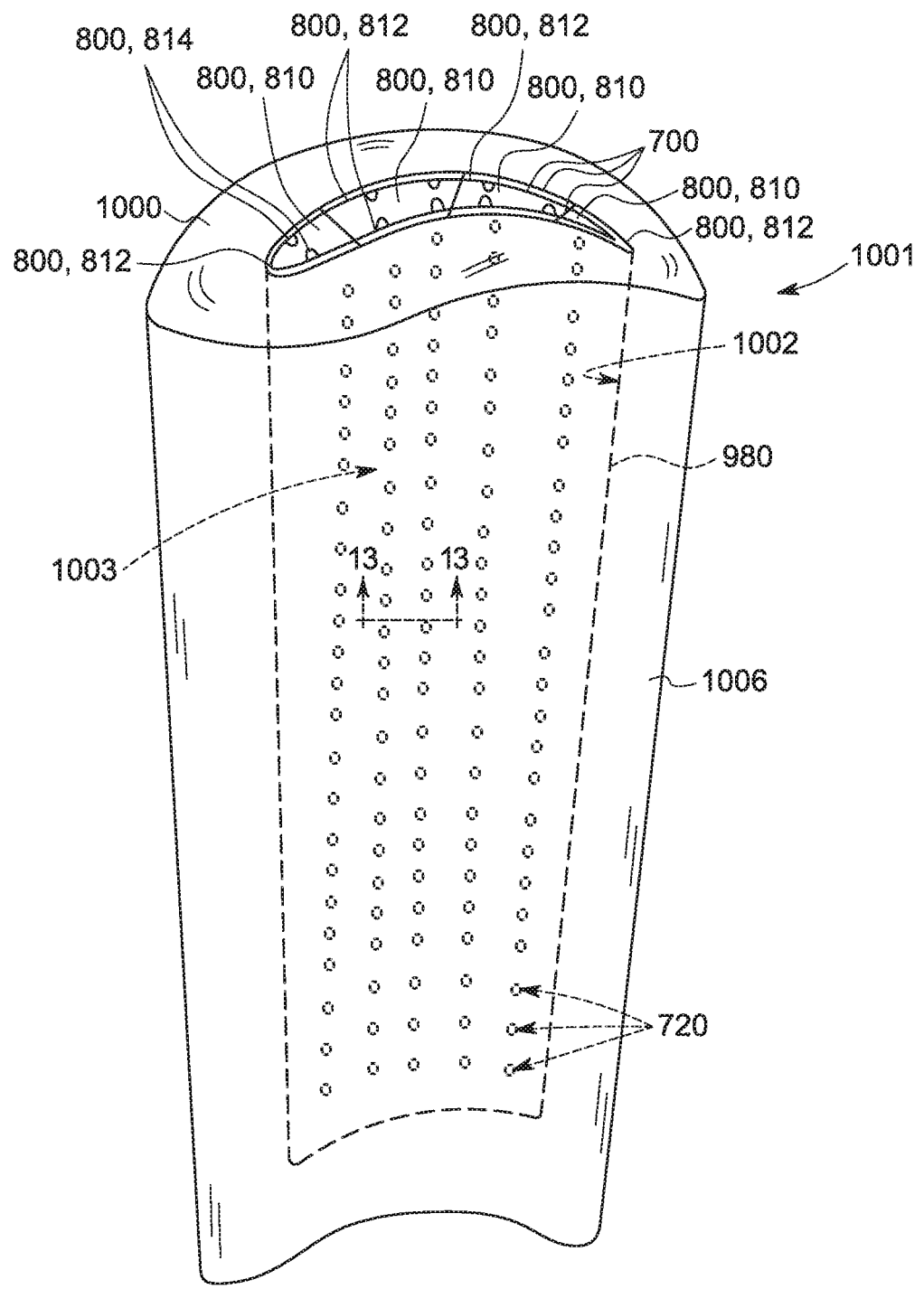
Figure 13:
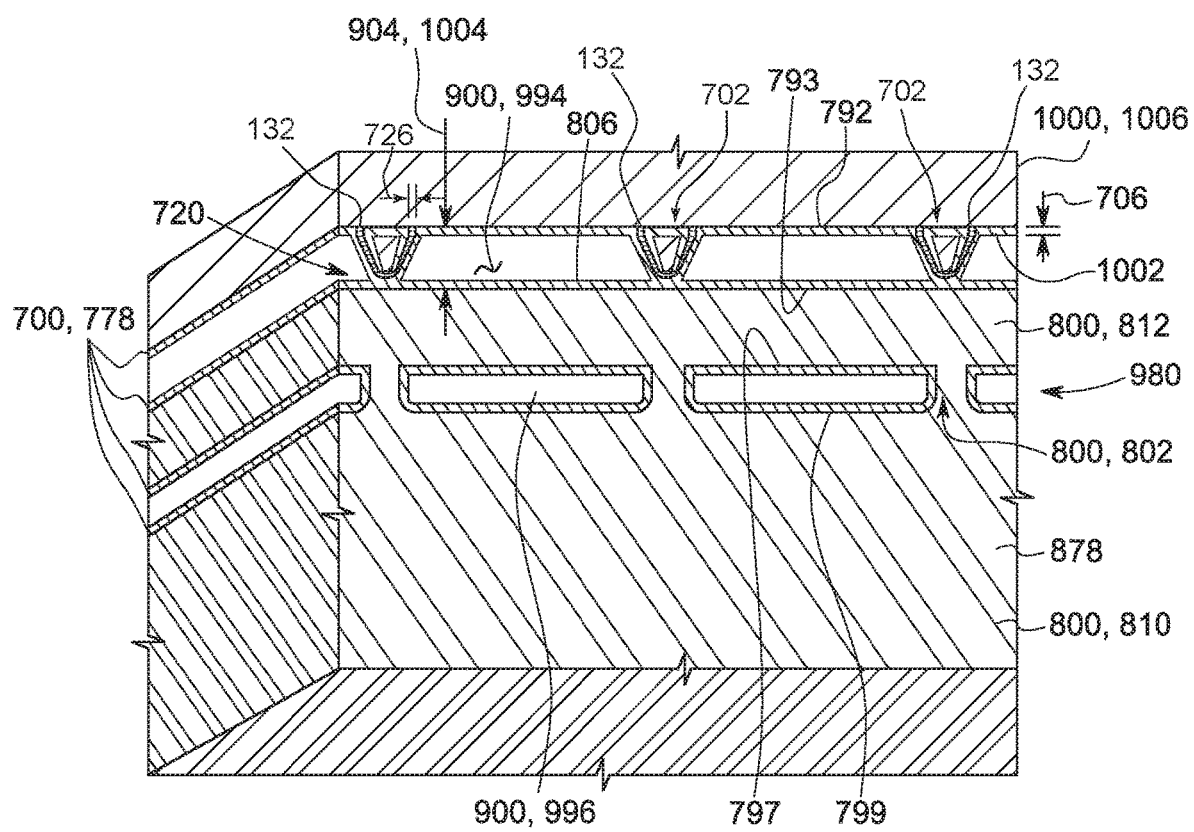

FIG. 12 is a schematic perspective view of an exemplary mold assembly that includes the exemplary jacketed core shown in FIG. 11 and that may be used to form the exemplary component shown in FIGS. 2-6; and FIG. 13 is a schematic perspective sectional view of a portion of the exemplary mold assembly shown in FIG. 12, taken along lines 13-13 in FIG. 12 and corresponding to the portion of the exemplary jacketed core shown in FIG. 11.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise.

The exemplary components described herein overcome at least some of the disadvantages associated with known systems for internal cooling of a component. More specifically, the embodiments described herein include a plurality of openings defined in and extending through an outer wall of the component, and a plurality of separable plugs each positioned in a corresponding opening of the plurality of openings. The separable plugs are decoupleable from the outer wall in response to the outer wall reaching a threshold temperature, such as in the event of a local spall of a thermal barrier coating over the separable plug. After the separable plugs decouple, cooling fluid from an internal cooling fluid pathway escapes from the openings, providing localized film cooling to mitigate, for example, the spall event.

Figure 1:
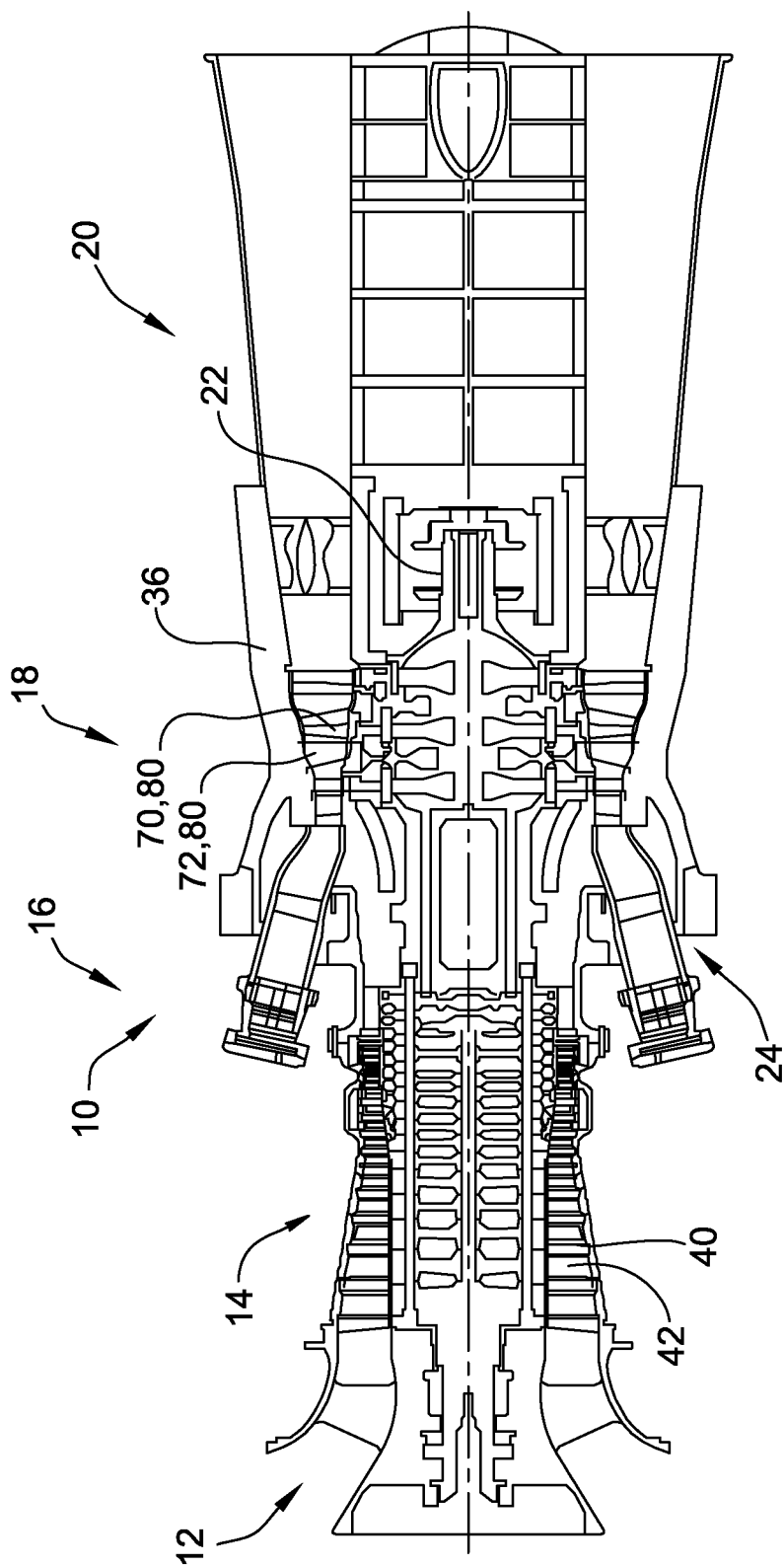
FIG. 1 is a schematic diagram of an exemplary rotary machine.

FIG. 1 is a schematic view of an exemplary rotary machine 10 having components for which embodiments of the current disclosure may be used. In the exemplary embodiment, rotary machine 10 is a gas turbine that includes an intake section 12, a compressor section 14 coupled downstream from intake section 12, a combustor section 16 coupled downstream from compressor section 14, a turbine section 18 coupled downstream from combustor section 16, and an exhaust section 20 coupled downstream from turbine section 18. A generally tubular casing 36 at least partially encloses one or more of intake section 12, compressor section 14, combustor section 16, turbine section 18, and exhaust section 20. In alternative embodiments, rotary machine 10 is any rotary machine for which components formed with internal passages as described herein are suitable. Moreover, although embodiments of the present disclosure are described in the context of a rotary machine for purposes of illustration, it should be understood that the embodiments described herein are applicable in any context that involves a component exposed to a high temperature environment.

In the exemplary embodiment, turbine section 18 is coupled to compressor section 14 via a rotor shaft 22. It should be noted that, as used herein, the term "couple" is not limited to a direct mechanical, electrical, and/or communication connection between components, but may also include an indirect mechanical, electrical, and/or communication connection between multiple components.

During operation of gas turbine 10, intake section 12 channels air towards compressor section 14. Compressor section 14 compresses the air to a higher pressure and temperature. More specifically, rotor shaft 22 imparts rotational energy to at least one circumferential row of compressor blades 40 coupled to rotor shaft 22 within compressor section 14. In the exemplary embodiment, each row of compressor blades 40 is preceded by a circumferential row of compressor stator vanes 42 extending radially inward from casing 36 that direct the air flow into compressor blades 40. The rotational energy of compressor blades 40 increases a pressure and temperature of the air. Compressor section 14 discharges the compressed air towards combustor section 16.

In combustor section 16, the compressed air is mixed with fuel and ignited to generate combustion gases that are channeled towards turbine section 18. More specifically, combustor section 16 includes at least one combustor 24, in which a fuel, for example, natural gas and/or fuel oil, is injected into the air flow, and the fuel-air mixture is ignited to generate high temperature combustion gases that are channeled towards turbine section 18.

Turbine section 18 converts the thermal energy from the combustion gas stream to mechanical rotational energy. More specifically, the combustion gases impart rotational energy to at least one circumferential row of rotor blades 70 coupled to rotor shaft 22 within turbine section 18. In the exemplary embodiment, each row of rotor blades 70 is preceded by a circumferential row of turbine stator vanes 72 extending radially inward from casing 36 that direct the combustion gases into rotor blades 70. Rotor shaft 22 may be coupled to a load (not shown) such as, but not limited to, an electrical generator and/or a mechanical drive application. The exhausted combustion gases flow downstream from turbine section 18 into exhaust section 20. A path of the combustion gases through rotary machine 10 defines a hot gas path of rotary machine 10. Components of rotary machine 10 are designated as components 80. Components 80 proximate the hot gas path are subjected to high temperatures during operation of rotary machine 10. In alternative embodiments, component 80 is any component in any application that is exposed to a high temperature environment.

Figure 2:
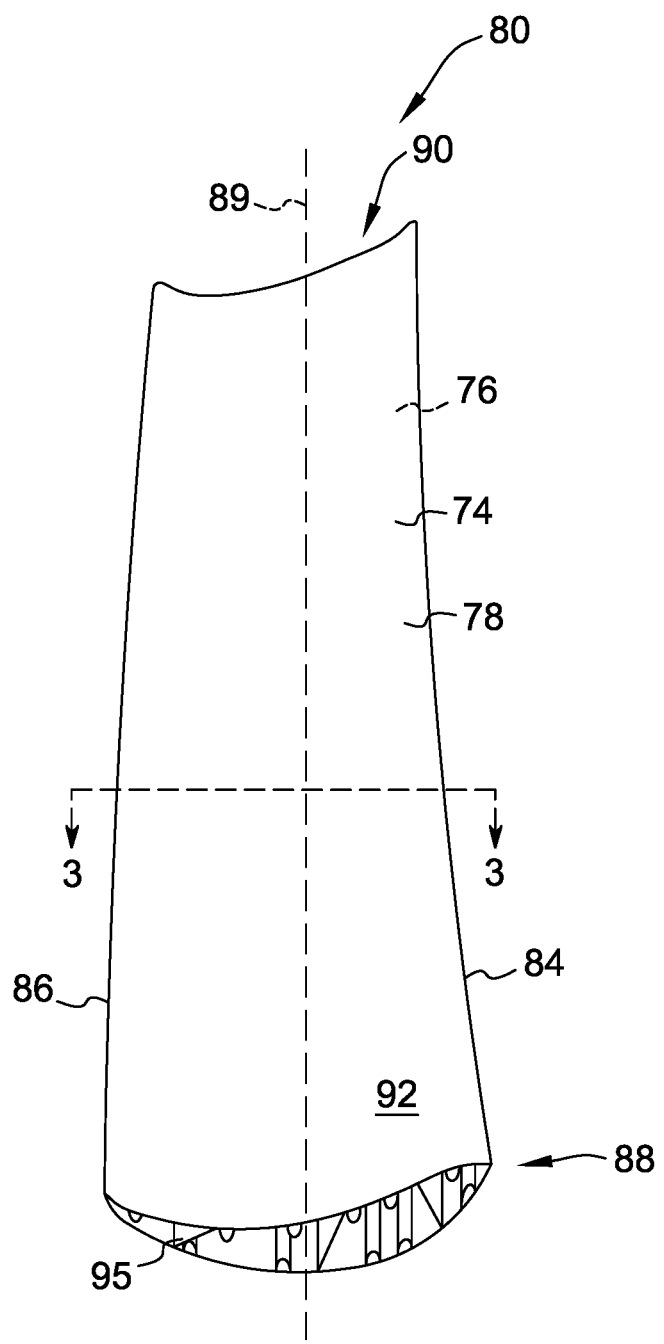
FIG. 2 is a schematic perspective view of an exemplary component for use with the rotary machine shown in FIG. 1.
Figure 3:
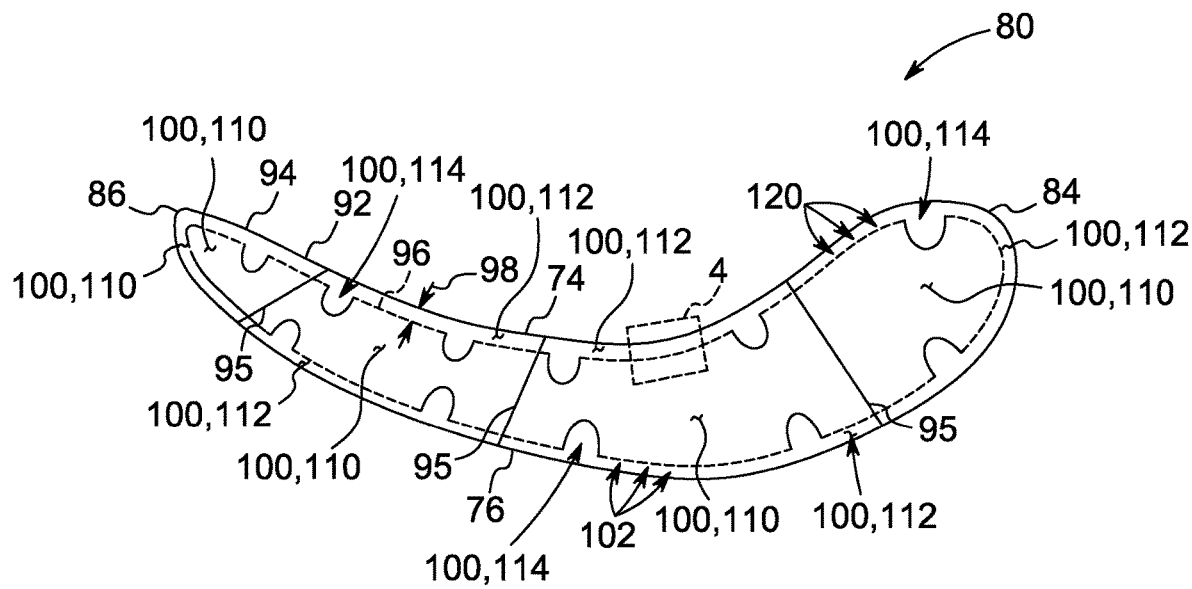
FIG. 3 is a schematic cross-section of the component shown in FIG. 2, taken along lines 3-3 shown in FIG. 2.
Figure 4:
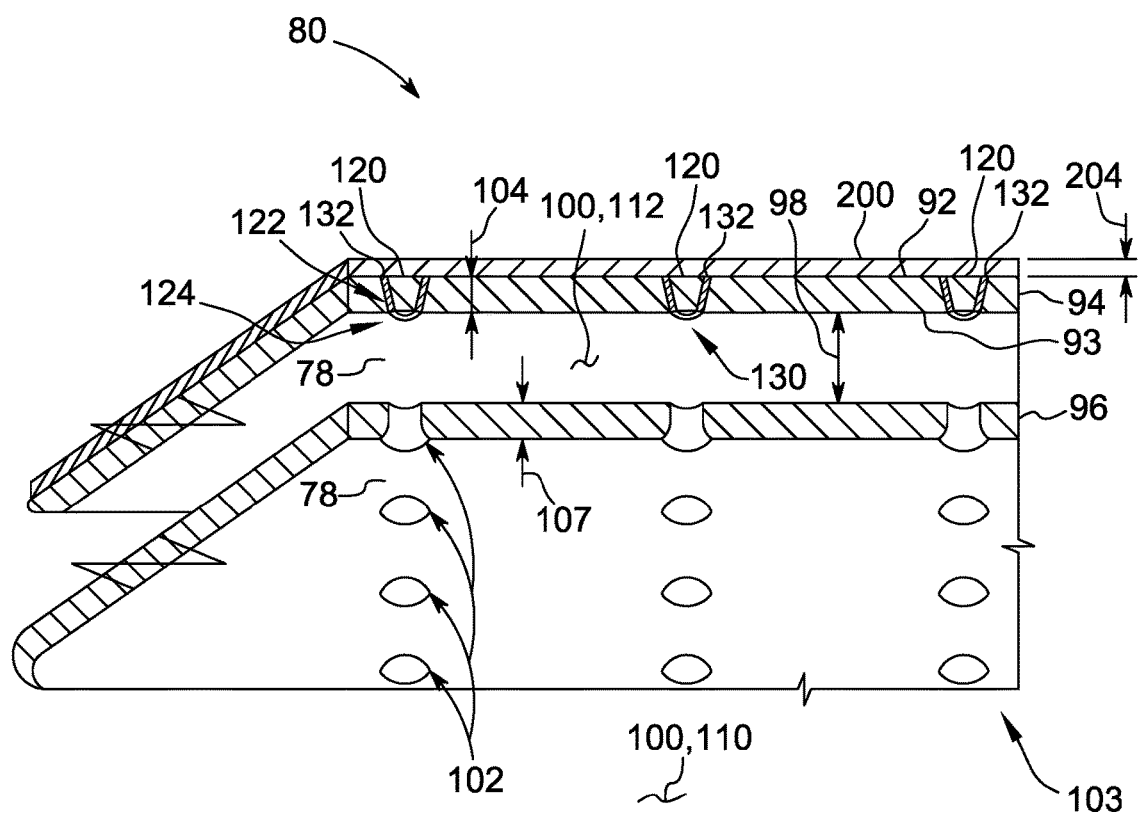
FIG. 4 is a schematic perspective sectional view of a portion of the component shown in FIGS. 2 and 3, designated as portion 4 in FIG. 3.

FIG. 2 is a schematic perspective view of an exemplary component 80, illustrated for use with rotary machine 10 (shown in FIG. 1). FIG. 3 is a schematic cross-section of component 80, taken along lines 3-3 (shown in FIG. 2). FIG. 4 is a schematic perspective sectional view of a portion of component 80, designated as portion 4 in FIG. 3. With reference to FIGS. 2-4, component 80 includes an outer wall 94 having a preselected thickness 104. Moreover, in the exemplary embodiment, component 80 includes at least one internal void 100 defined therein. For example, a cooling fluid is provided to internal void 100 during operation of rotary machine 10 to facilitate maintaining component 80 below a temperature of the hot combustion gases.

Component 80 is formed from a component material 78. In the exemplary embodiment, component material 78 is a suitable nickel-based superalloy. In alternative embodiments, component material 78 is at least one of a cobalt-based superalloy, an iron-based alloy, and a titanium-based alloy. In other alternative embodiments, component material 78 is any suitable material that enables component 80 to function as described herein.

In the exemplary embodiment, component 80 is one of rotor blades 70 or stator vanes 72. In alternative embodiments, component 80 is another suitable component of rotary machine 10. In still other embodiments, component 80 is any component in any application that is exposed to a high temperature environment.

In the exemplary embodiment, rotor blade 70, or alternatively stator vane 72, includes a pressure side 74 and an opposite suction side 76. Each of pressure side 74 and suction side 76 extends from a leading edge 84 to an opposite trailing edge 86. In addition, rotor blade 70, or alternatively stator vane 72, extends from a root end 88 to an opposite tip end 90. A longitudinal axis 89 of component 80 is defined between root end 88 and tip end 90. In alternative embodiments, rotor blade 70, or alternatively stator vane 72, has any suitable configuration that is capable of being formed with a preselected outer wall thickness as described herein.

Outer wall 94 at least partially defines an exterior surface 92 of component 80, and an interior surface 93 opposite exterior surface 92. In the exemplary embodiment, outer wall 94 extends circumferentially between leading edge 84 and trailing edge 86, and also extends longitudinally between root end 88 and tip end 90. In alternative embodiments, outer wall 94 extends to any suitable extent that enables component 80 to function for its intended purpose. Outer wall 94 is formed from component material 78.

In addition, in certain embodiments, component 80 includes an inner wall 96. Inner wall 96 is positioned interiorly to outer wall 94, and the at least one internal void 100 includes at least one plenum 110 that is at least partially defined by inner wall 96 and interior thereto. In the exemplary embodiment, each plenum 110 extends from root end 88 to proximate tip end 90. In alternative embodiments, each plenum 110 extends within component 80 in any suitable fashion, and to any suitable extent, that enables component 80 to function as described herein. In the exemplary embodiment, the at least one plenum 110 includes a plurality of plenums 110, each defined by inner wall 96 and at least one partition wall 95 that extends at least partially between pressure side 74 and suction side 76. For example, in the illustrated embodiment, each partition wall 95 extends from outer wall 94 of pressure side 74 to outer wall 94 of suction side 76. In alternative embodiments, at least one partition wall 95 extends from inner wall 96 of pressure side 74 to inner wall 96 of suction side 76. Additionally or alternatively, at least one partition wall 95 extends from inner wall 96 to outer wall 94 of pressure side 74, and/or from inner wall 96 to outer wall 94 of suction side 76. In other alternative embodiments, the at least one internal void 100 includes any suitable number of plenums 110 defined in any suitable fashion. Inner wall 96 is formed from component material 78.

Moreover, in some embodiments, at least a portion of inner wall 96 extends circumferentially and longitudinally adjacent at least a portion of outer wall 94 and is separated therefrom by an offset distance 98, such that the at least one internal void 100 also includes at least one chamber 112 defined between inner wall 96 and outer wall 94. In the exemplary embodiment, the at least one chamber 112 includes a plurality of chambers 112 each defined by outer wall 94, inner wall 96, and at least one partition wall 95. In alternative embodiments, the at least one chamber 112 includes any suitable number of chambers 112 defined in any suitable fashion. In the exemplary embodiment, inner wall 96 defines a plurality of apertures 102 extending therethrough, such that each chamber 112 is in flow communication with at least one plenum 110.

In the exemplary embodiment, offset distance 98 is selected to facilitate effective impingement cooling of outer wall 94 by cooling fluid supplied through plenums 110 and emitted through apertures 102 defined in inner wall 96 towards interior surface 93 of outer wall 94. For example, but not by way of limitation, offset distance 98 varies circumferentially and/or longitudinally along component 80 to facilitate local cooling requirements along respective portions of outer wall 94. In alternative embodiments, offset distance 98 is selected in any suitable fashion. Also in the exemplary embodiment, apertures 102 are arranged in a pattern 103 selected to facilitate effective impingement cooling of outer wall 94. For example, but not by way of limitation, pattern 103 varies circumferentially and/or longitudinally along component 80 to facilitate local cooling requirements along respective portions of outer wall 94. In alternative embodiments, pattern 103 is selected in any suitable fashion.

In some embodiments, apertures 102 are each sized and shaped to emit cooling therethrough in a jet towards interior surface 93. For example, apertures 102 each have a substantially circular or ovoid cross-section. In alternative embodiments, apertures 102 each have any suitable shape and size that enables apertures 102 to be function as described herein.

In the exemplary embodiment, inner wall 96 and partition walls 95 define at least part of a skeletal structure of component 80 that substantially carries an operational load of component 80, while outer wall 94 is integral with inner wall 96 and/or partition walls 95, but carries very little loading. For example, a thickness 107 of inner wall 96 and/or a thickness (not numbered) of partition walls 95 is selected to facilitate load bearing. In alternative embodiments, the thickness of inner wall 96 and/or partition walls 95 is selected in any suitable fashion.

Also in the exemplary embodiment, outer wall 94 defines a boundary between component 80 and the hot gas environment, and has a very small thickness 104 selected to facilitate effective cooling of outer wall 94 with a reduced amount of cooling fluid flow as compared to components having thicker outer walls. In alternative embodiments, outer wall thickness 104 is any suitable thickness that enables component 80 to function for its intended purpose. In certain embodiments, outer wall thickness 104 varies along outer wall 94. In alternative embodiments, outer wall thickness 104 is constant along outer wall 94.

In certain embodiments, the at least one internal void 100 further includes at least one return channel 114 in flow communication with at least one chamber 112, such that each return channel 114 provides a return fluid flow path for fluid used for impingement cooling of outer wall 94. For example, in the exemplary embodiment, each return channel 114 is at least partially defined by inner wall 96. Also in the exemplary embodiment, each return channel 114 extends from root end 88 to proximate tip end 90. In alternative embodiments, each return channel 114 extends within component 80 in any suitable fashion, and to any suitable extent, that enables component 80 to function as described herein. In the exemplary embodiment, the at least one return channel 114 includes a plurality of return channels 114, each defined by inner wall 96 adjacent one of chambers 112. In alternative embodiments, the at least one return channel 114 includes any suitable number of return channels 114 defined in any suitable fashion. In other alternative embodiments, component 80 does not include any return channels 114. For example, outer wall 94 also includes openings extending therethrough which are not plugged (not shown) that channel fluid from chambers 112 therethrough to provide film cooling of an exterior of outer wall 94.

Although the at least one internal void 100 is illustrated as including plenums 110, chambers 112, and return channels 114 for use in cooling component 80 that is one of rotor blades 70 or stator vanes 72, it should be understood that in alternative embodiments, component 80 is any suitable component for any suitable application, and includes any suitable number, type, and arrangement of internal voids 100 that enable component 80 to function for its intended purpose.

In the exemplary embodiment, component 80 further includes a coating 200 coupled adjacent exterior surface 92 of outer wall 94. Coating 200 is formed from at least one material selected to protect outer wall 94 from the high temperature environment. For example, thermal barrier coating 200 includes a suitable bond coat layer adjacent to, and configured to adhere to, exterior surface 92, and a suitable thermal barrier outer layer adjacent to the bond coat layer. In alternative embodiments, coating 200 is formed from any suitable material. Coating 200 has a thickness 204. For clarity of illustration, coating 200 is hidden in FIG. 2.

For example, during operation, cooling fluid is supplied to plenums 110 through root end 88 of component 80. As the cooling fluid flows generally towards tip end 90, portions of the cooling fluid are forced through apertures 102 into chambers 112 and impinge upon interior surface 93 of outer wall 94. In the exemplary embodiment, the used cooling fluid then flows into return channels 114 and flows generally toward root end 88 and out of component 80. In some such embodiments, the arrangement of the at least one plenum 110, the at least one chamber 112, and the at least one return channel 114 forms a portion of a cooling circuit of rotary machine 10, such that used cooling fluid is returned to a working fluid flow through rotary machine 10 upstream of combustor section 16 (shown in FIG. 1). Although impingement flow through plenums 110 and chambers 112 and return flow through channels 114 is described in terms of embodiments in which component 80 is rotor blade 70 and/or stator vane 72, a circuit of plenums 110, chambers 112, and return channels 114 is suitable for any component 80 of rotary machine 10, and additionally for any suitable component 80 for any other application suitable for closed circuit fluid flow through a component. Such embodiments provide an improved operating efficiency for rotary machine 10 as compared to cooling systems that exhaust used cooling fluid directly from component 80 into the working fluid within turbine section 18.

In alternative embodiments, the at least one internal void 100 does not include return channels 114. For example, but not by way of limitation, outer wall 94 includes predefined openings (not shown) extending completely therethrough and not configured to be plugged, and the cooling fluid is exhausted into the working fluid through the outer wall openings to facilitate film cooling of exterior surface 92. In other alternative embodiments, component 80 includes both return channels 114 and predefined openings (not shown) extending through outer wall 94, a first portion of the cooling fluid is returned to a working fluid flow through rotary machine 10 upstream of combustor section 16 (shown in FIG. 1), and a second portion of the cooling fluid is exhausted into the working fluid through the outer wall openings to facilitate film cooling of exterior surface 92.

Outer wall 94 includes a plurality of separable plugs 120 defined therein. Separable plugs 120 each extend, in a direction generally normal to surface 93, from a first end 122 to an opposite second end 124. In the exemplary embodiment, second end 124 is defined at interior surface 93, while first end 122 is defined at exterior surface 92, such that a depth of each separable plug 120 is equal to outer wall thickness 104. In alternative embodiments, second end 124 is defined proximate interior surface 93, and/or first end 122 is defined proximate exterior surface 92, such that a depth of each separable plug 120 is slightly less than or approximately equal to outer wall thickness 104. In certain embodiments, first end 122 of separable plug 120 is flush with exterior surface 92, such that bonding of coating 200 to exterior surface 92 proximate separable plugs 120 is facilitated by a flat surface. In alternative embodiments, first end 122 of separable plug 120 is other than flush with exterior surface 92.

In the exemplary embodiment, plugs 120 are disposed in outer wall 94 such that each plug 120 is aligned with an aperture 102, such that film cooling is facilitated by cooling fluid jets from inner wall apertures 102 aimed directly through openings 130 after separable plug 120 is decoupled from outer wall 94. In alternative embodiments, plugs 120 are disposed in outer wall 94 in any suitable arrangement.

Figure 5:
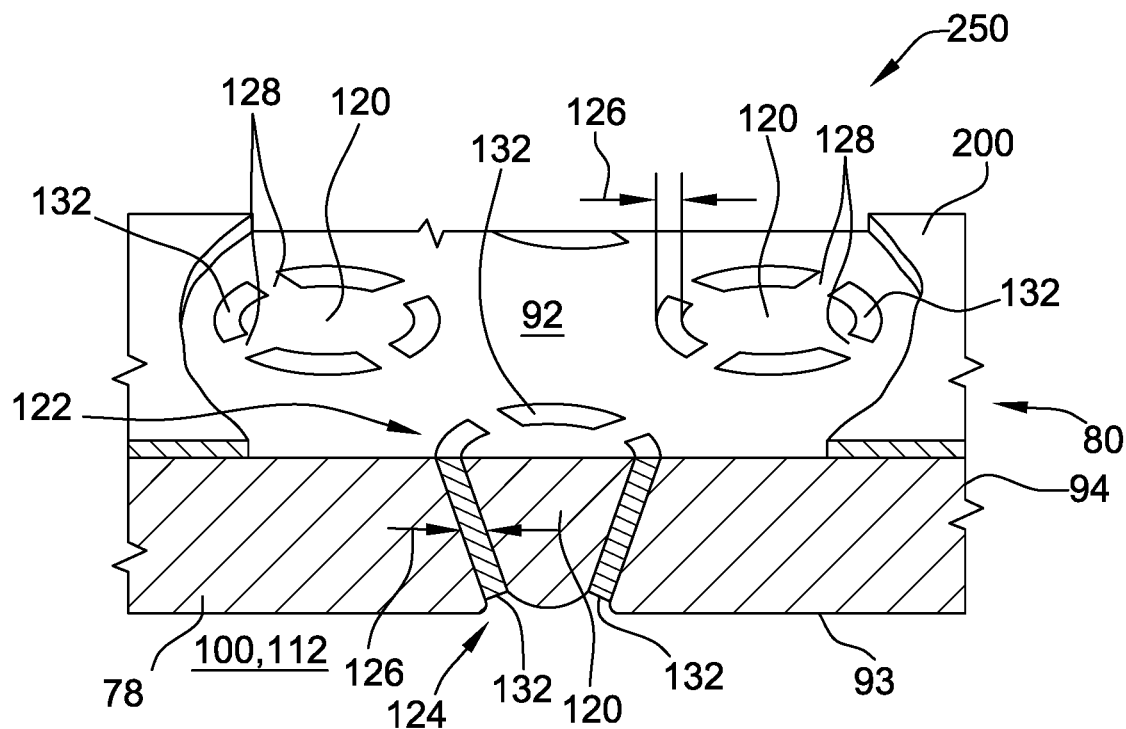
FIG. 5 is a schematic perspective sectional view of an exemplary outer wall of the component shown in FIG. 4, including an exemplary spalled region.
Figure 6:
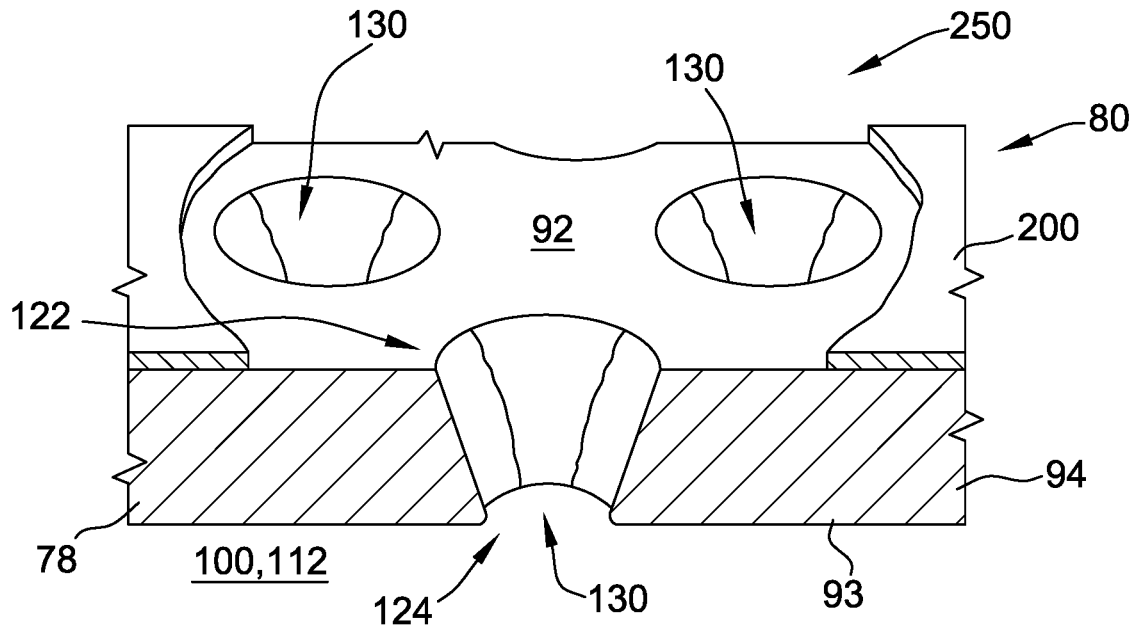
FIG. 6 is a perspective sectional view of the exemplary outer wall of FIG. 5 in which exemplary separable plugs have decoupled from the outer wall.

FIG. 5 is a perspective sectional view of an exemplary embodiment of outer wall 94 of component 80 including an exemplary spalled region 250 from which coating 200 has been removed, directly exposing exterior surface 92 to a high temperature operating environment. For example, region 250 is created when coating 200 is spalled or otherwise degraded by the high temperature environment. FIG. 6 is a perspective sectional view of the exemplary outer wall 94 from FIG. 5 in which separable plugs 120 have decoupled from outer wall 94 in response to the spallation event.

Separable plugs 120 are configured to decouple from outer wall 94 in response to a spallation event or other damage to coating 200, thereby exposing openings 130 extending through outer wall 94. More specifically, after spalled region 250 is formed and exterior surface 92 is directly exposed to the high temperature operating environment, the resulting external heat loading on separable plugs 120 reaches or surpasses a threshold temperature, causing separable plugs 120 in spalled region 250 to burn through, melt, or otherwise oxidize away, such that separable plugs 120 in spalled region 250 decouple from outer wall 94. Upon decoupling of separable plugs 120, openings 130 extending through outer wall 94 are unobstructed, placing the cooling fluid from the at least one chamber 112 in flow communication with exterior surface 92 of outer wall 94. More specifically, after decoupling of separable plugs 120, openings 130 allow cooling fluid to escape from chamber 112 through openings 130 to provide localized film cooling to exterior surface 92. In some embodiments, the film cooling provided by openings 130 facilitates mitigation of the spallation event, for example by maintaining an integrity of outer wall 94 in region 250 and/or preventing a size of spalled region 250 from growing. In some such embodiments, the decoupling of separable plugs 120 occurs at a threshold temperature that occurs in an absence of coating 200 and thus is encountered by separable plugs 120 only within spalled region 250, such that the resulting film cooling response is self-modulated in response to a size and location of spalled region 250.

With reference to FIGS. 4-6, in the exemplary embodiment, each separable plug 120 is sized to fit within a corresponding opening 130 such that a clearance gap 126 is defined between separable plug 120 and an edge of opening 130. In the exemplary embodiment, clearance gap 126 varies between first end 122 and second end 124 of each separable plug 120. In alternative embodiments, clearance gap 126 does not vary between first end 122 and second end 124.

Each separable plug 120 is coupled to outer wall 94 by at least one tab 128 that extends across clearance gap 126 from separable plug 120 to an edge of opening 130. For example, in the exemplary embodiment, each separable plug 120 is coupled to outer wall 94 by four tabs 128. In alternative embodiments, each separable plug 120 is coupled to outer wall 94 by any suitable number of tabs 128. In the exemplary embodiment, separable plugs 120 and tabs 128 are formed from component material 78 and are integral with outer wall 94.

In alternative embodiments, each of separable plugs 120 and tabs 128 are formed from any suitable material, and/or coupled to outer wall 94 in any suitable fashion, that enables separable plugs 120 to function as described herein. In the exemplary embodiment, each tab 128 extends from first end 122 to proximate second end 124. In alternative embodiments, each tab 128 extends to any suitable extent that enables separable plugs 120 to function as described herein.

In the exemplary embodiment, the at least one tab 128 associated with each separable plug 120 extends around less than an entire circumference of opening 130, such that at least a portion of clearance gap 126 extends from first end 122 to second end 124, that is, completely through outer wall 94. For example, in certain embodiments, a combined circumferential width of tabs 128 associated with each separable plug 120 is within a range of about one-eighth to one-half the circumference of opening 130. In alternative embodiments, the combined circumferential width of tabs 128 associated with each separable plug 120 is any suitable value that enables separable plugs 120 to function as described herein. In certain embodiments, at least one of a spacing and a circumferential width of each tab 128 facilitates decoupling of separable plug 120 at a selected threshold temperature, such as but not limited to a temperature associated with exposure of exterior surface 92 in spalled region 250.

Further in the exemplary embodiment, each clearance gap 126 between circumferentially facing surfaces of tabs 128 is at least partially filled with a filler material 132. Filler material 132 cooperates with separable plug 120 to seal opening 130 prior to a spallation event. In the exemplary embodiment, filler material 132 extends to first end 122 and is positioned flush with exterior surface 92, and also extends to proximate second end 124. In some such embodiments, positioning filler material 132 flush with exterior surface 92 provides a flat surface to facilitate bonding of coating 200 to exterior surface 92. In alternative embodiments, filler material 132 is positioned other than flush with exterior surface 92 and/or extends to any suitable extent that enables separable plugs 120 to function as described herein.

In alternative embodiments, the at least one tab 128 extends around an entirety of the circumference of opening 130. In some such embodiments, the at least one tab 128 extends only partially between first end 122 and second end 124, and filler material 132 is positioned in clearance gap 126 in the remaining space between first end 122 and second end 124. In other such embodiments, filler material 132 is not used.

In certain embodiments, filler material 132 is a refractory material, such as a ceramic material, which further facilitates decoupling of separable plugs 120 from outer wall 94. More specifically, after spalled region 250 is formed and exterior surface 92 is directly exposed to the high temperature operating environment, filler material 132 functions as a thermal insulator that concentrates the resulting external heat loading into separable plugs 120 and tabs 128. As a result, tabs 128 and separable plugs 120 tend to burn through, melt, or otherwise oxidize away more rapidly, such that separable plugs 120 in the spalled region 250 decouple from outer wall 94 and expose openings 130 for film cooling more rapidly. In alternative embodiments, filler material 132 is other than a refractory material.

Figure 7:
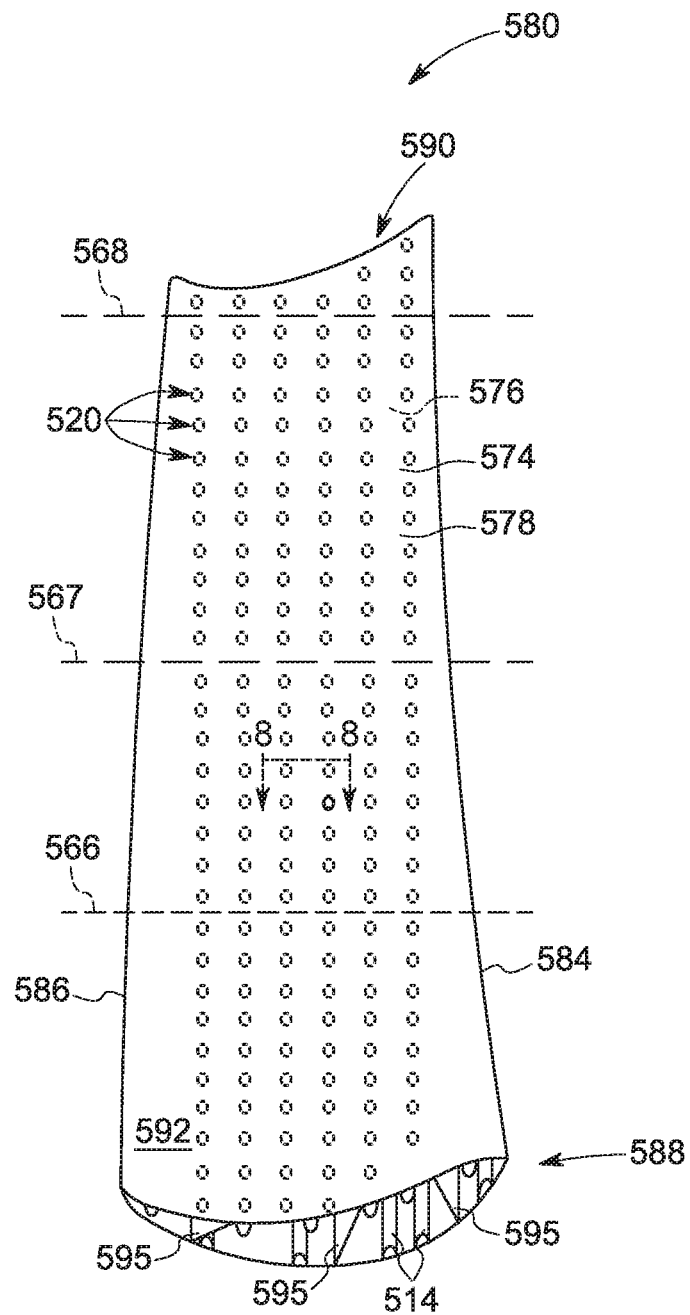
FIG. 7 is a schematic perspective view of an exemplary precursor component that may be used to form the component shown in FIGS. 2-6.
Figure 8:
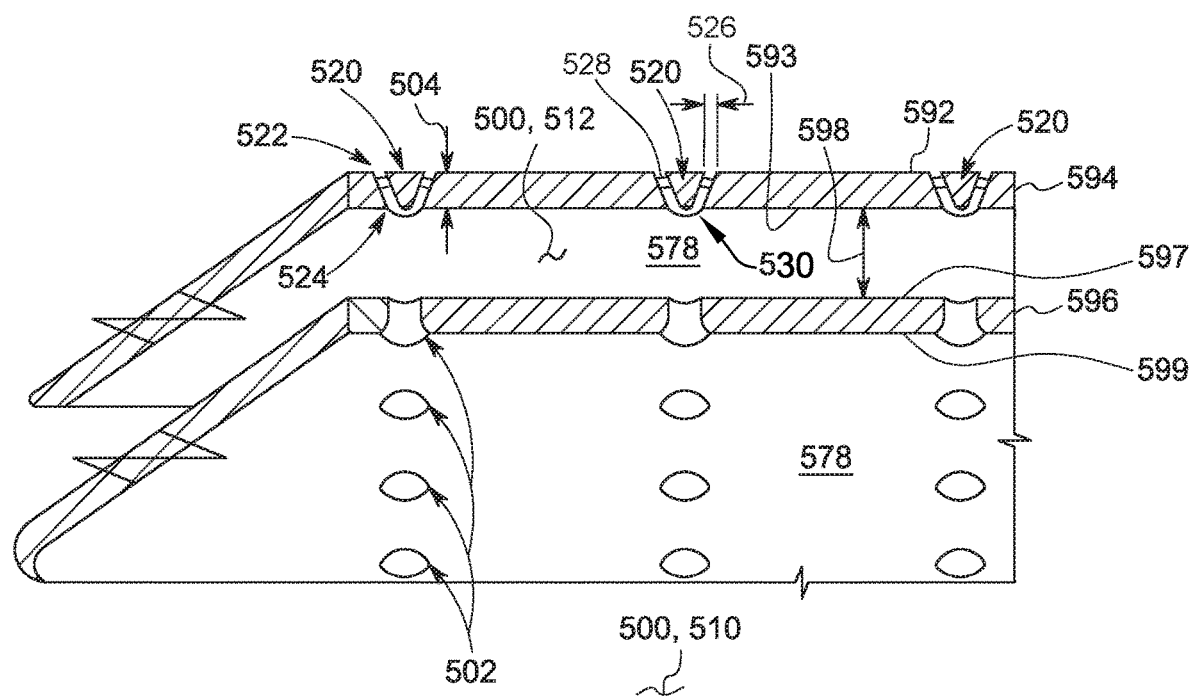
FIG. 8 is a schematic perspective sectional view of a portion of the exemplary precursor component shown in FIG. 7, taken along lines 8-8 in FIG. 7 and corresponding to the portion of the exemplary component shown in FIG. 4.

FIG. 7 is a schematic perspective view of an exemplary precursor component 580 that may be used to form component 80 shown in FIGS. 2-6. FIG. 8 is a schematic perspective sectional view of a portion of precursor component 580, taken along lines 8-8 in FIG. 7, and corresponding to the portion of component 80 shown in FIG. 4. With reference to FIGS. 2-5, 7, and 8, precursor component 580 is formed from a precursor material 578 and has a shape corresponding to a shape of at least portions of component 80. More specifically, in the exemplary embodiment, precursor component 580 includes an outer wall 594 shaped to correspond to outer wall 94 of component 80, and outer wall 594 includes at least one precursor plug 520 defined therein and shaped to correspond to a shape of separable plug 120 of component 80. In alternative embodiments, precursor component 580 does not include precursor plugs 520.

Furthermore, in some embodiments, a thickness 504 of outer wall 594 is reduced relative to thickness 104 of outer wall 94 by twice a thickness 706 of a jacket 700 to be applied to outer wall 594, as will be described herein. Alternatively, thickness 504 is not reduced relative to thickness 104.

For example, in the exemplary embodiment in which component 80 is one of rotor blades 70 or stator vanes 72 (shown in FIG. 1), precursor component 580 includes a pressure side 574 and an opposite suction side 576, a first end 588 and an opposite second end 590, and a leading edge 584 and an opposite trailing edge 586 shaped to correspond to pressure side 74, suction side 76, root end 88, tip end 90, leading edge 84, and trailing edge 86 of component 80.

In addition, precursor component 580 includes at least one internal void 500 that has a shape corresponding to the at least one void 100 of component 80. For example, in the exemplary embodiment, precursor component 580 includes at least one plenum 510, at least one chamber 512, and at least one return channel 514 corresponding to the at least one plenum 110, the at least one chamber 112, and the at least one return channel 114 of component 80. Moreover, precursor component 580 includes an inner wall 596 corresponding to inner wall 96 of component 80, and inner wall apertures 502 defined in inner wall 596 corresponding to apertures 102 of component 80. In some embodiments, precursor component 580 further includes at least one partition wall 595 that extends between pressure side 574 and suction side 576, corresponding to the at least one partition wall 95 of component 80.

Outer wall 594 at least partially defines an exterior surface 592 of precursor component 580. Inner wall 596 extends circumferentially and longitudinally adjacent at least a portion of outer wall 594 and is separated therefrom by an offset distance 598, corresponding to offset distance 98 of component 80. As described above, a shape of outer wall 594 and exterior surface 592 correspond to the shape of outer wall 94 and exterior surface 92 of component 80, including the at least one precursor plug 520 defined therein and configured to form separable plug 120, as will be described herein. In alternative embodiments, precursor component 580 does not include precursor plugs 520, and separable plugs 120 are formed by another suitable method, as will be described herein. Additionally, in some embodiments, outer wall 94 also includes predefined openings extending therethrough (not shown) that correspond to additional openings in outer wall 94 of component 80 configured to provide a baseline level of film cooling of exterior surface 92 of component 80 during normal operation, as described above.

In the exemplary embodiment, each precursor plug 520 is sized to fit within a corresponding precursor opening 530 such that a precursor clearance gap 526 is defined between precursor plug 520 and an edge of precursor opening 530. In the exemplary embodiment, precursor clearance gap 526 is increased relative to clearance gap 126 of separable plug 120 of component 80 by twice a thickness 706 of a jacket 700 to be applied to outer wall 594, as will be described herein. Alternatively, precursor clearance gap 526 is not increased relative to clearance gap 126.

Each precursor plug 520 is coupled to outer wall 594 by at least one precursor tab 528 that extends across precursor clearance gap 526 from precursor plug 520 to an edge of precursor opening 530, and corresponds to the at least one tab 128 that couples separable plug 120 to outer wall 94 of component 80. For example, in the exemplary embodiment, each precursor plug 520 is coupled to outer wall 594 by four precursor tabs 528, corresponding to component 80 shown in FIG. 5. In the exemplary embodiment, precursor plug 520 and tabs 528 are formed from precursor material 578 and are integral with outer wall 594. In alternative embodiments, each of precursor plugs 520 and tabs 528 are formed from any suitable material, and/or coupled to outer wall 594 in any suitable fashion, that enables precursor plugs 520 to function as described herein. In the exemplary embodiment, each precursor tab 528 extends to any suitable extent that enables tabs 128 to be formed as described herein.

In alternative embodiments, component 80 is any suitable component for any suitable application, and precursor component 580 has a shape that corresponds to the shape of such component 80.

In the exemplary embodiment, precursor plugs 520 each extend, in a direction generally normal to surface 593, from a first end 522 to an opposite second end 524. In the exemplary embodiment, second end 524 is defined at interior surface 593, while first end 522 is defined at exterior surface 592, such that a depth of each precursor plug 520 is equal to outer wall thickness 504. In alternative embodiments, second end 524 is defined proximate interior surface 593, while first end 522 is defined proximate exterior surface 592, such that a depth of each precursor plug 520 is slightly less than or approximately equal to outer wall thickness 504. In the exemplary embodiment, precursor plugs 520 are disposed in outer wall 594 such that each plug 520 is aligned with an aperture 502. In alternative embodiments, plugs 520 are disposed in outer wall 594 in any suitable arrangement.

In some embodiments, precursor component 580 is formed at least partially using a suitable additive manufacturing process, and precursor material 578 is selected to facilitate additive manufacture of precursor component 580. For example, a computer design model of precursor component 580 is developed from a computer design model of component 80, with some embodiments including outer wall thickness 504 reduced, as described above. The computer design model for precursor component 580 is sliced into a series of thin, parallel planes between first end 588 and second end 590 of precursor component 580. A computer numerically controlled (CNC) machine deposits successive layers of precursor material 578 from first end 588 to second end 590 in accordance with the model slices to form precursor component 580. Three such representative layers are indicated as layers 566, 567, and 568.

In some such embodiments, precursor material 578 is selected to be a photopolymer, and the successive layers of precursor material 578 are deposited using a stereolithographic process. Alternatively, precursor material 578 is selected to be a thermoplastic, and the successive layers of precursor material 578 are deposited using at least one of a fused filament fabrication process, an inkjet/powder bed process, a selective heat sintering process, and a selective laser sintering process. Additionally or alternatively, precursor material 578 is selected to be any suitable material, and the successive layers of precursor material 578 are deposited using any suitable process that enables precursor component 580 to be formed as described herein. It should be understood that in certain embodiments, precursor component 580 is formed from a plurality of separately additively manufactured sections that are subsequently coupled together in any suitable fashion.

In certain embodiments, the formation of precursor component 580 by an additive manufacturing process enables precursor component 580 to be formed with a nonlinearity, structural intricacy, precision, and/or repeatability that is not achievable by other methods. Accordingly, the formation of precursor component 580 by an additive manufacturing process enables the complementary formation of core 800 (shown in FIG. 11), and thus of component 80, with a correspondingly increased nonlinearity, structural intricacy, precision, and/or repeatability. Additionally or alternatively, the formation of precursor component 580 using an additive manufacturing process enables the formation of internal voids 500 that could not be reliably added to component 80 in a separate process after initial formation of component 80 in a mold. Moreover, in some embodiments, the formation of precursor component 580 by an additive manufacturing process using precursor material 578 that is a photopolymer or thermoplastic decreases a cost and/or a time required for manufacture of component 80, as compared to forming component 80 directly by additive manufacture using a metallic component material 78.

In alternative embodiments, precursor component 580 is formed in any suitable fashion that enables precursor component 580 to function as described herein. For example, but not by way of limitation, a suitable pattern material, such as wax, is injected into a suitable pattern die to form precursor component 580. Again, it should be understood that in certain embodiments, precursor component 580 is formed from a plurality of separately formed sections that are subsequently coupled together in any suitable fashion.

Figure 9:
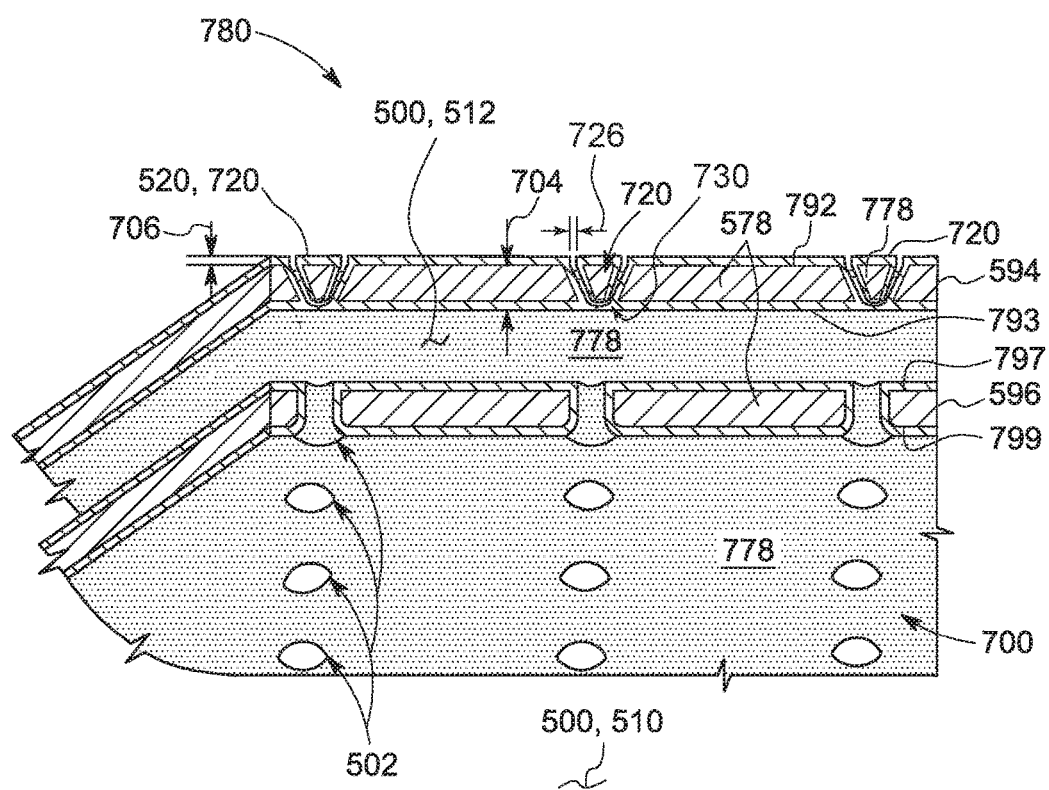
FIG. 9 is a schematic perspective sectional view of a portion of an exemplary jacketed precursor component that includes an exemplary jacket coupled to the exemplary precursor component shown in FIG. 8.

FIG. 9 is a schematic perspective sectional view of a portion of an exemplary jacketed precursor component 780 that includes an exemplary jacket 700 coupled to precursor component 580. With reference to FIGS. 4, 5, and 7-9, in certain embodiments, jacket 700 includes at least one layer of a jacket material 778 adjacent at least a portion of a surface of precursor component 580. For example, in the exemplary embodiment, jacket 700 includes a first jacket outer wall 792 adjacent exterior surface 592, and a second jacket outer wall 793 adjacent opposing second surface 593 of outer wall 594, such that second jacket outer wall 793 is positioned interiorly from first jacket outer wall 792. Jacket outer walls 792 and 793 have shapes corresponding to exterior surface 592 and second surface 593, respectively, of precursor component outer wall 594. Moreover, in some embodiments, jacket outer walls 792 and 793 are configured to separate a perimeter 806 of core 800 from an interior wall 1002 of a mold 1000 (shown in FIG. 12) used to form component 80 by thickness 104 of outer wall 94, as will be described herein.

Additionally in the exemplary embodiment, jacket 700 includes jacket material 778 adjacent precursor plugs 520 and precursor tabs 528, such that jacketed precursor plugs 720 positioned within jacketed precursor openings 730 are formed. A jacketed precursor clearance gap 726 is defined between jacketed precursor plug 720 and an edge of jacketed precursor opening 730. In the exemplary embodiment, because precursor clearance gap 526 is increased relative to clearance gap 126 of separable plug 120 of component 80 by twice thickness 706 of jacket 700, jacketed precursor clearance gap 726 is equal to clearance gap 126 of separable plug 120 of component 80. Alternatively, precursor clearance gap 526 is not increased relative to clearance gap 126, and thickness 706 of jacket 700 is relatively small compared to precursor clearance gap 526, such that jacketed precursor clearance gap 726 approximately corresponds to clearance gap 126 of separable plug 120. In the exemplary embodiment, after precursor material 578 is removed, as will be described herein, portions of jacket 700 formed adjacent precursor tabs 528 also define a pathway for molten component material 78 to form the at least one tab 128 and separable plug 120 during casting of component 78, as also will be described herein. Alternatively, jacket 700 is formed in any suitable fashion to define a pathway for molten component material 78 to form the at least one tab 128 and separable plug 120 during casting of component 80.

Moreover, in some embodiments, each jacketed precursor plug 720 is configured to separate perimeter 806 from interior wall 1002 by thickness 104. More specifically, as discussed above, thickness 504 of outer wall 594 is reduced relative to thickness 104 of outer wall 94 by twice thickness 706 of jacket 700, such that a combined thickness 704 of first jacket outer wall 792, second jacket outer wall 793, and outer wall 594 corresponds to thickness 104 of outer wall 94 of component 80. Alternatively, thickness 504 is not reduced relative to thickness 104, and thickness 706 of jacket 700 is relatively small compared to thickness 504, such that combined thickness 704 of first jacket outer wall 792, second jacket outer wall 793, and outer wall 594 approximately corresponds to thickness 104 of outer wall 94 of component 80.

Also in the exemplary embodiment, jacket material 778 is adjacent opposing surfaces 597 and 599 of inner wall 596 to form opposing jacket inner walls 797 and 799 positioned interiorly from second jacket outer wall 793. Further in the exemplary embodiment, jacket material 778 is adjacent inner wall 596 adjacent inner wall apertures 502, such that inner wall apertures 502 jacketed by jacket material 778 extend through inner wall 596. Moreover, in certain embodiments, jacketed precursor component 780 continues to define the at least one internal void 500 that has a shape corresponding to the at least one void 100 of component 80. For example, in the exemplary embodiment, jacketed precursor component 780 includes at least one plenum 510, at least one chamber 512, and at least one return channel 514 (shown in FIG. 5). In some embodiments, jacket 700 further is adjacent opposing surfaces of partition walls 595 (shown in FIG. 5). Additionally or alternatively, jacket 700 is adjacent any suitable portion of the surface of precursor component 580 that enables jacketed precursor component 780 to function as described herein.

In the exemplary embodiment, jacket 700 has a substantially uniform thickness 706. In alternative embodiments, thickness 706 varies over at least some portions of jacket 700. In certain embodiments, thickness 706 is selected to be small relative to outer wall thickness 504. In some embodiments, thickness 706 also is selected such that jacketed precursor plugs 720 and/or other portions of jacket 700 provide at least a minimum selected structural stiffness such that combined thickness 704 defined by first jacket outer wall 792 and second jacket outer wall 793 is maintained when precursor material 578 is not positioned therebetween, as will be described herein.

In certain embodiments, jacket material 778 is selected to be at least partially absorbable by molten component material 78. For example, component material 78 is an alloy, and jacket material 778 is at least one constituent material of the alloy. Moreover, in some embodiments, jacket material 778 includes a plurality of materials disposed on precursor component 580 in successive layers, as will be described herein.

For example, in the exemplary embodiment, component material 78 is a nickel-based superalloy, and jacket material 778 is substantially nickel, such that jacket material 778 is compatible with component material 78 when component material 78 in the molten state is introduced into mold 1000 (shown in FIG. 12). In alternative embodiments, component material 78 is any suitable alloy, and jacket material 778 is at least one material that is compatible with the molten alloy. For example, component material 78 is a cobalt-based superalloy, and jacket material 778 is substantially cobalt. For another example, component material 78 is an iron-based alloy, and jacket material 778 is substantially iron. For another example, component material 78 is a titanium-based alloy, and jacket material 778 is substantially titanium.

In certain embodiments, thickness 706 is sufficiently thin such that jacket material 778 is substantially absorbed by component material 78 when component material 78 in the molten state is introduced into mold 1000 (shown in FIG. 13). For example, in some such embodiments, jacket material 778 is substantially absorbed by component material 78 such that no discrete boundary delineates jacket material 778 from component material 78 after component material 78 is cooled. Moreover, in some such embodiments, jacket 700 is substantially absorbed such that, after component material 78 is cooled, jacket material 778 is substantially uniformly distributed within component material 78. For example, a concentration of jacket material 778 proximate core 800 (shown in FIG. 11) is not detectably higher than a concentration of jacket material 778 at other locations within component 80. For example, and without limitation, jacket material 778 is nickel and component material 78 is a nickel-based superalloy, and no detectable higher nickel concentration remains proximate core 800 after component material 78 is cooled, resulting in a distribution of nickel that is substantially uniform throughout the nickel-based superalloy of formed component 80.

In alternative embodiments, thickness 706 is selected such that jacket material 778 is other than substantially absorbed by component material 78. For example, in some embodiments, jacket material 778 is partially absorbed by component material 78, such that after component material 78 is cooled, jacket material 778 is other than substantially uniformly distributed within component material 78. For example, a concentration of jacket material 778 proximate core 800 is detectably higher than a concentration of jacket material 778 at other locations within component 80. In some such embodiments, jacket material 778 is insubstantially absorbed, that is, at most only slightly absorbed, by component material 78 such that a discrete boundary delineates jacket material 778 from component material 78 after component material 78 is cooled. Additionally or alternatively, in some such embodiments, jacket material 778 is insubstantially absorbed, that is, at most only slightly absorbed, by component material 78 such that at least a portion of jacket 700 proximate core 800 and/or at least a portion of jacket 700 proximate interior wall 1002 remains intact after component material 78 is cooled.

In some embodiments, jacket 700 is formed on at least a portion of the surface of precursor component 580 by a plating process, such that jacket material 778 is deposited on precursor component 580 until the selected thickness 706 of jacket 700 is achieved. For example, jacket material 778 is a metal, and is deposited on precursor component 580 in a suitable metal plating process. In some such embodiments, jacket material 778 is deposited on precursor component 580 in an electroless plating process. Additionally or alternatively, jacket material 778 is deposited on precursor component 580 in an electroplating process. In alternative embodiments, jacket material 778 is any suitable material, and jacket 700 is formed on precursor component 580 by any suitable plating process that enables jacket 700 to function as described herein.

In certain embodiments, jacket material 778 includes a plurality of materials disposed on precursor component 580 in successive layers. For example, precursor material 578 is a thermoplastic, an initial layer of jacket material 778 is a first metal alloy selected to facilitate electroless plating deposition onto precursor material 578, and a subsequent layer of jacket material 778 is a second metal alloy selected to facilitate electroplating to the prior layer of jacket material 778. In some such embodiments, each of the first and second metal alloys are alloys of nickel. In other embodiments, precursor material 578 is any suitable material, jacket material 778 is any suitable plurality of materials, and jacket 700 is formed on precursor component 580 by any suitable process that enables jacket 700 to function as described herein.

In certain embodiments, jacketed precursor component 780 is formed from a unitary precursor component 580. In alternative embodiments, jacketed precursor component 780 is formed from a precursor component 580 that is other than unitarily formed. For example, jacketed precursor component 780 includes precursor component 580 formed from a plurality of separately formed sections coupled together. In some such embodiments, the separately formed precursor sections are coupled together prior to applying jacket 700. Alternatively, jacket 700 is applied to at least one separately formed precursor section prior to coupling the separately formed precursor sections together. Furthermore, in some such embodiments, a jacketed core 980 (shown in FIG. 11) is formed by filling the at least one internal void 500 of jacketed precursor component 780 with a core material 878, firing to cure core 800, and removing precursor material 578, as described below. In alternative embodiments, core 800 is formed from core material 878 and fired in a separate core-forming process, sections of jacketed precursor component 780 are coupled around the pre-formed core 800, and precursor material 578 is removed to form jacketed core 980.

In alternative embodiments, jacket 700 is formed in any suitable fashion. For example, jacket 700 is formed using a process that does not involve precursor component 580. In some such embodiments, jacket 700 is formed at least partially using a suitable additive manufacturing process, and jacket material 778 is selected to facilitate additive manufacture of jacket 700. For example, a computer design model of jacket 700 is developed from a computer design model of component 80, with preselected thickness 706 of jacket 700 added in the computer design model adjacent selected surfaces of component 80, as described above, and then component 80 itself is removed from the computer design model. The computer design model for jacket 700 is sliced into a series of thin, parallel planes, and a computer numerically controlled (CNC) machine deposits successive layers of jacket material 778 from a first end to a second end of jacket 700 in accordance with the model slices to form jacket 700. In some embodiments, the successive layers of jacket material 778 are deposited using at least one of a direct metal laser melting (DMLM) process, a direct metal laser sintering (DMLS) process, and a selective laser sintering (SLS) process. Additionally or alternatively, jacket 700 is formed using another suitable additive manufacturing process. It should be understood that in certain embodiments, jacket 700 is formed from a plurality of separately additively manufactured sections that are subsequently coupled together, such as around a separately formed core 800, in any suitable fashion.

In certain embodiments, the formation of jacket 700 by an additive manufacturing process enables jacket 700 to be formed with a nonlinearity, structural intricacy, precision, and/or repeatability that is not achievable by other methods. Accordingly, the formation of jacket 700 by an additive manufacturing process enables the complementary formation of core 800 (shown in FIG. 11), and thus of component 80, with a correspondingly increased nonlinearity, structural intricacy, precision, and/or repeatability. Additionally or alternatively, the formation of jacket 700 using an additive manufacturing process enables the formation of internal voids 500 that could not be reliably added to component 80 in a separate process after initial formation of component 80 in a mold. Moreover, in some embodiments, the formation of jacket 700 by an additive manufacturing process decreases a cost and/or a time required for manufacture of component 80, as compared to forming component 80 directly by additive manufacture using component material 78.

Figure 10:
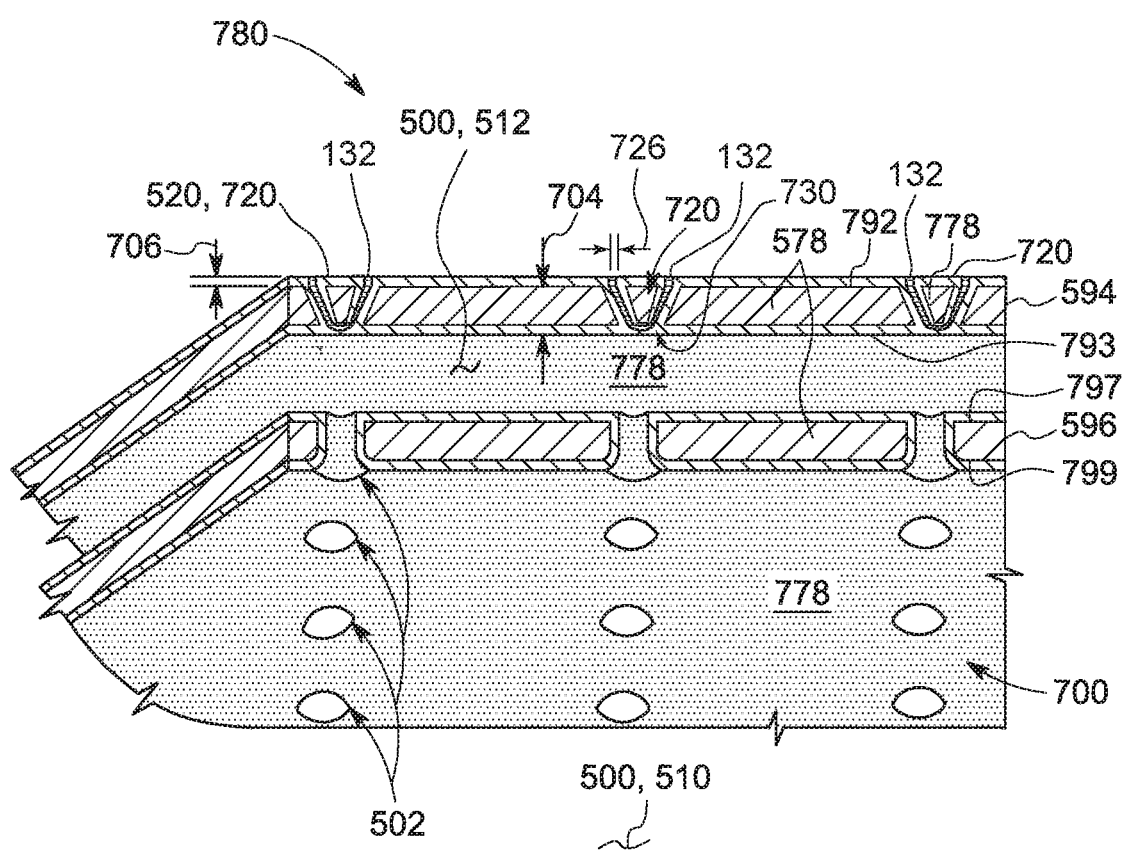
FIG. 10 is a schematic perspective sectional view of the portion of the exemplary jacketed precursor component shown in FIG. 9, having a filler material inserted.

FIG. 10 is a schematic perspective sectional view of the portion of exemplary jacketed precursor component 780 shown in FIG. 9, having filler material 132 inserted into precursor clearance gaps 726 between jacketed precursor plugs 720 and respective edges of jacketed precursor openings 730. As discussed above, in certain embodiments, filler material 132 is a refractory material, such as a ceramic. For example, filler material 132 is inserted into precursor clearance gaps 726 as a ceramic paste, and then jacketed precursor component 780 is dried and/or fired to harden filler material 132 within precursor clearance gaps 726. In some embodiments, filler material 132 is fired simultaneously with a process of oxidizing, or "burning out," precursor material 578 from jacketed precursor component 780. In alternative embodiments, filler material 132 is inserted into precursor clearance gaps 726 and/or fired after precursor material 578 is removed from jacketed precursor component 780.

In alternative embodiments, filler material 132 is any suitable material, and is inserted in any suitable fashion, that enables separable plugs 120 to function as described herein.

FIG. 11 is a schematic perspective sectional view of a portion of an exemplary jacketed core 980 that includes exemplary core 800 within jacket 700. More specifically, core 800 is positioned interiorly from second jacket outer wall 793, such that perimeter 806 of core 800 is coupled against second jacket outer wall 793. Thus, core 800 is located within the at least one internal void 500 of jacketed precursor component 780 (shown in FIG. 10). For example, in the exemplary embodiment, core 800 includes at least one plenum core portion 810, at least one chamber core portion 812, and at least one return channel core portion (shown in FIG. 12) positioned respectively in the at least one plenum 510, the at least one chamber 512, and the at least one return channel 514 of jacketed precursor component 780. The at least one plenum core portion 810, the at least one chamber core portion 812, and the at least one return channel core portion 814 are configured to define, respectively, the at least one plenum 110, the at least one chamber 112, and the at least one return channel 114 when component 80 is formed. Further in the exemplary embodiment, core 800 includes inner wall aperture core portions 802 positioned in inner wall apertures 502 of jacketed precursor component 780, and inner wall aperture core portions 802 are configured to define inner wall apertures 102 when component 80 is formed.

Core 800 is formed from a core material 878. In the exemplary embodiment, core material 878 is a refractory ceramic material selected to withstand a high temperature environment associated with the molten state of component material 78 used to form component 80. For example, but without limitation, core material 878 includes at least one of silica, alumina, and mullite. Moreover, in the exemplary embodiment, core material 878 is selectively removable from component 80 to form the at least one internal void 100. For example, but not by way of limitation, core material 878 is removable from component 80 by a suitable process that does not substantially degrade component material 78, such as, but not limited to, a suitable chemical leaching process. In certain embodiments, core material 878 is selected based on a compatibility with, and/or a removability from, component material 78. In alternative embodiments, core material 878 is any suitable material that enables component 80 to be formed as described herein.

In some embodiments, jacketed core 980 is formed by filling the at least one internal void 500 of jacketed precursor component 780 with core material 878, and by removing precursor component 580 from jacketed precursor component 780. For example, in the exemplary embodiment, core material 878 is injected as a slurry into plenums 510, chambers 512, and return channels 514 defined by jacket 700. In some embodiments, filler material 132 prevents core material 878 from entering into jacketed precursor clearance gaps 726 or otherwise flowing exteriorly of second jacket outer wall 793. In alternative embodiments in which outer wall 94 includes predefined openings extending therethrough, as described above, core material 878 flows exteriorly of second jacket outer wall 793 to define the predefined openings. Core material 878 is dried and fired to form core 800, and precursor component outer wall 594, precursor component inner wall 596, and precursor partition walls 595 are removed from jacketed precursor component 780, for example by oxidizing or "burning out" precursor material 578 from jacketed precursor component 780.

In certain embodiments, removal of precursor material 578 and firing of core 800 are performed at least partially simultaneously, for example by applying an elevated temperature profile that results in both core firing and precursor material oxidation. In alternative embodiments, burning out of precursor material 578 and firing of core 800 are performed in separate processes. Moreover, it should be understood that formation of core 800 and removal of precursor component 580 can be performed in any suitable order that enables jacketed core 980 to function as described herein. For example, in some embodiments, the at least one internal void 500 of jacketed precursor component 780 is filled with core material 878 prior to removal of precursor component 580 to form jacketed core 980. In alternative embodiments, jacketed core 980 is formed from jacket 700 that is first decoupled from, or formed without using, precursor component 580, as described above.

In alternative embodiments, core 800 is formed and positioned in any suitable fashion that enables core 800 to function as described herein. For example, but not by way of limitation, core material 878 is injected as a slurry into a suitable core die (not shown), dried, and fired in a separate core-forming process to form core 800. In some such embodiments, for example, sections of jacketed precursor component 780 are coupled around the separately formed core 800 during formation of jacketed core 980. In other such embodiments, for example, sections of jacket 700 are decoupled from, or formed without using, precursor component 580, and the sections of jacket 700 are coupled around the separately formed core 800 to form jacketed core 980. In still other embodiments, for example, jacket 700 is decoupled from, or formed without using, precursor component 580, and core material 878 is added as a slurry to jacket 700 and fired within jacket 700 to form core 800 within jacketed core 980.

Jacketed core 980 defines at least one jacketed cavity 900 therewithin. Each at least one jacketed cavity 900 is configured to receive molten component material 78 therein to form a corresponding portion of component 80. More specifically, molten component material 78 is added to the at least one jacketed cavity 900 and cooled, such that component material 78 and jacket material 778 bounded by core 800 and/or interior wall 1002 (shown in FIG. 12) at least partially define the corresponding portion of component 80, as will be described herein.

In the exemplary embodiment, first jacket outer wall 792 and second jacket outer wall 793 define at least one jacketed cavity 900, designated as at least one outer wall jacketed cavity 994, therebetween. As discussed above, jacket 700 separates perimeter 806 from interior wall 1002 of mold 1000 (shown in FIG. 12) by thickness 104 of component outer wall 94 (shown in FIG. 4). Thus, a shape of the at least one outer wall jacketed cavity 994 corresponds to a shape of outer wall 94 of component 80.

Similarly, opposing jacket inner walls 797 and 799 define at least one inner wall jacketed cavity 996 therebetween. Because a shape of jacket inner walls 797 and 799 corresponds to a shape of inner wall 96 of component 80, a shape of the at least one inner wall jacketed cavity 996 corresponds to a shape of inner wall 96 of component 80. Moreover, in some embodiments, the opposing jacket partition walls corresponding to component partition walls 95 define at least one partition wall jacketed cavity (not shown) therebetween.

In alternative embodiments, jacketed core 980 defines the at least one jacketed cavity 900 having a shape corresponding to any suitable portion of component 80 for use in any suitable application.

In certain embodiments, precursor material 578 is selected to facilitate removal of precursor component 580 from within jacketed precursor component 780. In some such embodiments, precursor material 578 is selected to have an oxidation point that is less than a melting point of jacket material 778. For example, a temperature of jacketed precursor component 780 is raised to or above the oxidation point of precursor material 578, such that precursor component 580 is burned out of jacket 700. In other such embodiments, precursor material 578 is selected to have a melting point that is less than a melting point of jacket material 778. For example, a temperature of jacketed precursor component 780 is raised to or above the melting point of precursor material 578, such that precursor component 580 is melted and drained out of jacket 700. As discussed above, in some such embodiments, precursor component 580 is removed at least partially simultaneously with a firing of core 800. Alternatively, precursor material 578 is removed prior to firing core 800.

Additionally or alternatively, precursor material 578 is selected to be a softer material than jacket material 778, and precursor component 580 is machined out of jacketed precursor component 780. For example, a mechanical rooter device is snaked into jacket 700 to break up and/or dislodge precursor material 578 to facilitate removal of precursor component 580. Additionally or alternatively, precursor material 578 is selected to be compatible with a chemical removal process, and precursor component 580 is removed from jacket 700 using a suitable solvent.

In alternative embodiments, precursor material 578 is any suitable material that enables precursor component 580 to be removed from within jacketed precursor component 780 in any suitable fashion. In other alternative embodiments, jacket 700 is formed by a process that does not include any use of precursor component 580, as described above, such that no precursor material 578 needs to be removed to form jacketed core 980.

In the exemplary embodiment, core 800 includes, as described above, the at least one plenum core portion 810 positioned interiorly from second jacket inner wall 799, the at least one chamber core portion 812 positioned between first jacket inner wall 797 and second jacket outer wall 793, and inner wall aperture core portions 802 extending through the at least one inner wall jacketed cavity 996. In some embodiments, core 800 also includes the at least one return channel core portion 814 (shown in FIG. 12). In certain embodiments, jacket 700 provides a skeleton structure within jacketed core 980 that facilitates positioning the plurality of portions of core 800 with respect to each other and, subsequently, with respect to mold 1000 (shown in FIG. 12).

In alternative embodiments, core 800 is configured to correspond to any other suitable configuration of the at least one internal void 100 that enables component 80 to function for its intended purpose.

In certain embodiments, jacket 700 structurally reinforces core 800, thus reducing potential problems that would be associated with production, handling, and use of an unreinforced core 800 to form component 80 in some embodiments. For example, in certain embodiments, core 800 is a relatively brittle ceramic material subject to a relatively high risk of fracture, cracking, and/or other damage. Thus, in some such embodiments, forming and transporting jacketed core 980 presents a much lower risk of damage to core 800, as compared to using an unjacketed core 800. Similarly, in some such embodiments, forming a suitable mold 1000 (shown in FIG. 12) around jacketed core 980, such as by repeated investment of jacketed core 980 in a slurry of mold material, presents a much lower risk of damage to jacketed core 980, as compared to using an unjacketed core 800. Thus, in certain embodiments, use of jacketed core 980 presents a much lower risk of failure to produce an acceptable component 80, as compared to forming component 80 using an unjacketed core 800.

FIG. 12 is a schematic perspective view of an exemplary mold assembly 1001 that includes jacketed core 980 and may be used to form component 80 shown in FIGS. 2-6. FIG. 13 is a schematic perspective sectional view of a portion of mold assembly 1001, taken along lines 13-13 in FIG. 12, and including the portion of jacketed core 980 shown in FIG. 11. With reference to FIGS. 2-6, 12, and 13, mold assembly 1001 includes jacketed core 980 positioned with respect to mold 1000. An interior wall 1002 of mold 1000 defines a mold cavity 1003 within mold 1000, and jacketed core 980 is at least partially received in mold cavity 1003. More specifically, interior wall 1002 defines a shape corresponding to an exterior shape of component 80, such that first jacket outer wall 792, which also has a shape corresponding to the exterior shape of component 80, is coupled against interior wall 1002.

In addition, jacket 700 separates core perimeter 806 from interior wall 1002 by thickness 104 of component outer wall 94, as discussed above, such that molten component material 78 is receivable within the at least one jacketed cavity 900 defined between jacket outer walls 792 and 793 to form outer wall 94 having preselected thickness 104. More specifically, when first jacket outer wall 792 is coupled against interior wall 1002, perimeter 806 of the at least one chamber core portion 812 is positioned with respect to interior wall 1002 at an offset distance 1004 that corresponds to a combined thickness 904 of first jacket outer wall 792, second jacket outer wall 793, and outer wall jacketed cavity 994, which in turn corresponds to thickness 104 of outer wall 94 of component 80. The at least one outer wall jacketed cavity 994 is configured to receive molten component material 78, such that core perimeter 806 adjacent the at least one outer wall jacketed cavity 994 cooperates with interior wall 1002 of mold 1000 to define outer wall 94 of component 80 having thickness 104. Jacket material 778 adjacent the at least one outer wall jacketed cavity 994 and component material 78, collectively bounded by core perimeter 806 and mold interior wall 1002, form outer wall 94. In some embodiments, for example, jacket material 778 of jacket outer walls 792 and 793 is substantially absorbed by molten component material 78 to form outer wall 94, while in other embodiments, for example, jacket outer walls 792 and 793 remain at least partially intact adjacent component material 78 within outer wall 94, as described above.

Filler material 132 remains positioned within jacketed precursor clearance gap 726 during formation of mold 1000, such that a shape of first jacket outer wall 792 proximate jacketed precursor plugs 720 corresponds to the exterior shape of component 80 proximate separable plugs 120. Moreover, filler material 132 is a refractory material, as discussed above, such that filler material 132 remains in position with respect to mold 1000 and core 800 as molten component material 78 is received within the at least one jacketed cavity 900. Thus, as molten component material 78 cools to form component 80, filler material 132 remains in place to define clearance gaps 126 adjacent separable plugs 120 in outer wall 94.

Moreover, as described above, core 800 is shaped to correspond to a shape of at least one internal void 100 of component 80, such that core 800 of jacketed core 980 positioned within mold cavity 1003 defines the at least one internal void 100 within component 80 when component 80 is formed. For example, in the exemplary embodiment, the at least one inner wall jacketed cavity 996 is configured to receive molten component material 78, such that the at least one plenum core portion 810, the at least one chamber core portion 812, and/or the inner wall aperture core portions 802 adjacent the at least one inner wall jacketed cavity 996 cooperate to define inner wall 96 of component 80. Jacket material 778 adjacent the at least one inner wall jacketed cavity 996 and component material 78, collectively bounded by the at least one plenum core portion 810, the at least one chamber core portion 812, and the inner wall aperture core portions 802, form inner wall 96. In some embodiments, for example, jacket material 778 of jacket inner walls 797 and 799 is substantially absorbed by molten component material 78 to form inner wall 96, while in other embodiments, for example, jacket inner walls 797 and 799 remain at least partially intact adjacent component material 78 within inner wall 96, as described above.

The at least one plenum core portion 810 defines the at least one plenum 110 interiorly of inner wall 96, the at least one chamber core portion 812 defines the at least one chamber 112 between inner wall 96 and outer wall 94, and the inner wall aperture core portions 802 define inner wall apertures 102 extending through inner wall 96. Moreover, in some embodiments, the at least one return channel core portion 814 defines the at least one return channel 114 at least partially defined by inner wall 96.

After component material 78 is cooled in the at least one jacketed cavity 900 to form component 80, core 800 is removed from component 80 to form the at least one internal void 100. For example, but not by way of limitation, core material 878 is removed from component 80 using a chemical leaching process. In some such embodiments, filler material 132 also is susceptible to removal by the same chemical leaching process, such that a portion of filler material 132 adjacent core perimeter 806 also is removed in the process of removing core 800. However, in some such embodiments, the removal process is suitably controlled such that a substantial portion of filler material 132 remains in place adjacent separable plugs 120 after component 80 is formed, as shown in FIG. 4.

It should be recalled that, although component 80 in the exemplary embodiment is rotor blade 70, or alternatively stator vane 72, in alternative embodiments component 80 is any component suitably formable with an outer wall as described herein and for use in any application.

Mold 1000 is formed from a mold material 1006. In the exemplary embodiment, mold material 1006 is a refractory ceramic material selected to withstand a high temperature environment associated with the molten state of component material 78 used to form component 80. In alternative embodiments, mold material 1006 is any suitable material that enables component 80 to be formed as described herein. Moreover, in the exemplary embodiment, mold 1000 is formed by a suitable investment process. For example, but not by way of limitation, jacketed core 980 is repeatedly dipped into a slurry of mold material 1006 which is allowed to harden to create a shell of mold material 1006, and the shell is fired to form mold 1000. In alternative embodiments, mold 1000 is formed by any suitable method that enables mold 1000 to function as described herein.

In certain embodiments, after first jacket outer wall 792 is coupled against interior wall 1002, jacketed core 980 is secured relative to mold 1000 such that core 800 remains fixed relative to mold 1000 during a process of forming component 80. For example, jacketed core 980 is secured such that a position of core 800 does not shift during introduction of molten component material 78 into the at least one jacketed cavity 900. In some embodiments, external fixturing (not shown) is used to secure jacketed core 980 relative to mold 1000. Additionally or alternatively, jacketed core 980 is secured relative to mold 1000 in any other suitable fashion that enables the position of core 800 relative to mold 1000 to remain fixed during a process of forming component 80.

The above-described embodiments enable improved mitigation of spalling or other degradation of exterior surfaces of internally cooled components, as compared to at least some known cooling systems. Specifically, the embodiments described herein include a plurality of openings defined in and extending through an outer wall of the component, and a plurality of separable plugs each positioned in a corresponding opening of the plurality of openings. The separable plugs are decoupleable from the outer wall in response to the outer wall reaching a threshold temperature, such as in the event of a local spall of a thermal barrier coating over the separable plug. After the separable plugs decouple, cooling fluid from an internal cooling fluid pathway escapes from the openings, providing localized film cooling to mitigate, for example, the spall event. Also specifically, in some embodiments, the separable plugs are formed integrally with the outer wall, facilitating an ease of manufacture of the component. Moreover, in some embodiments, a filler material positioned in a clearance gap between the separable plugs and the openings cooperates with the separable plugs to seal the openings on regions of the exterior surface where the temperature remains below the threshold temperature. Also specifically, the filler material functions as a thermal insulator that concentrates the resulting external heat loading into separable plugs through at least one tab that extends across the clearance gap.

An exemplary technical effect of the methods, systems, and apparatus described herein includes at least one of: (a) mitigating an effect of spalling or other degradation of a thermal barrier coating on the exterior surface of an internally cooled component, such as oxidation or "burn through"; and (b) automatically "modulating" an amount of film cooling provided based on localized high-temperature regions on the exterior surface.

Exemplary embodiments of internally cooled components are described above in detail. The components, and methods and systems using such components, are not limited to the specific embodiments described herein, but rather, components of systems and/or steps of the methods may be utilized independently and separately from other components and/or steps described herein. For example, the exemplary embodiments can be implemented and utilized in connection with many other applications that are currently configured to use components in high temperature environments.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A component comprising:
   an outer wall comprising an exterior surface and an opposite interior surface, said outer wall formed from a component material;
   at least one internal void defined adjacent said interior surface and configured to receive a cooling fluid therein;
   a plurality of openings defined in and extending through said outer wall such that said outer wall defines an edge of each of said plurality of openings; and
   a plurality of separable plugs formed from said component material, each plug of said plurality of separable plugs positioned in a corresponding opening of said plurality of openings, each of said separable plugs sized to fit within said corresponding opening such that a clearance gap is defined between said separable plug and said edge of said corresponding opening, each of said separable plugs coupled to said outer wall by at least one tab that extends across said clearance gap from said each separable plug to said edge of said corresponding opening, said at least one tab formed from said component material.

2. A component comprising:
an outer wall comprising an exterior surface and an opposite interior surface;
at least one internal void defined adjacent said interior surface and configured to receive a cooling fluid therein;
a plurality of openings defined in and extending through said outer wall such that said outer wall defines an edge of each of said plurality of openings; and
a plurality of separable plugs, each plug of said plurality of separable plugs positioned in a corresponding opening of said plurality of openings, each of said separable plugs sized to fit within said corresponding opening such that a clearance gap is defined between said separable plug and said edge of said corresponding opening, each of said separable plugs coupled to said outer wall by at least one tab that extends across said clearance gap from said each separable plug to said edge of said corresponding opening; and
a filler material positioned in said clearance gap of each of said separable plugs, said filler material cooperates with each of said separable plugs to seal said corresponding opening.

3. The component of claim 2, wherein said filler material is a refractory material.

4. The component of claim 2, wherein said filler material is flush with said exterior surface.

5. The component of claim 1, wherein said component material extends integrally from said outer wall through said at least one tab to each of said separable plugs.

6. The component of claim 1, wherein each of said separable plugs is decoupleable from said outer wall in response to said exterior surface reaching a threshold temperature, such that said at least one internal void is placed in flow communication with said exterior surface.

7. The component of claim 1, wherein each of said separable plugs extends from a first end adjacent said exterior surface to a second end adjacent said interior surface, said first end is flush with said exterior surface.

8. The component of claim 1, wherein each of said separable plugs extends from a first end adjacent said exterior surface to a second end adjacent said interior surface, said at least one tab extends from said first end toward said second end.

9. The component of claim 1, wherein each said corresponding opening defines a circumference, said at least one tab associated with each of said separable plugs extends around less than an entirety of said circumference.

10. The component of claim 9, wherein a combined circumferential width of said at least one tab associated with each of said separable plugs is within a range of about one-eighth to one-half said circumference of said corresponding opening.

11. A rotary machine comprising:
a combustor section configured to generate combustion gases;
a turbine section configured to receive the combustion gases from said combustor section and produce mechanical rotational energy therefrom, wherein a path of the combustion gases through said rotary machine defines a hot gas path; and
a component in heat flow communication with said hot gas path, said component comprising:
an outer wall comprising an exterior surface and an opposite interior surface;
at least one internal void defined adjacent said interior surface and configured to receive a cooling fluid therein;
a plurality of openings defined in and extending through said outer wall such that said outer wall defines an edge of each of said plurality of openings, wherein each said opening defines a circumference; and
a plurality of separable plugs, each plug of said plurality of separable plugs positioned in a corresponding opening of said plurality of openings, each of said separable plugs sized to fit within said corresponding opening such that a clearance gap is defined between said separable plug and said edge of said corresponding opening, each of said separable plugs coupled to said outer wall by at least one tab that extends across said clearance gap from said each separable plug to said edge of said corresponding opening, wherein said at least one tab associated with each of said separable plugs extends around less than an entirety of said circumference.

12. The rotary machine of claim 11, further comprising a filler material positioned in said clearance gap of each of said separable plugs, said filler material cooperates with each of said separable plugs to seal said corresponding opening.

13. The rotary machine of claim 12, wherein said filler material is a refractory material.

14. The rotary machine of claim 12, wherein said filler material is flush with said exterior surface.

15. The rotary machine of claim 11, wherein said outer wall is formed from a component material, said plurality of separable plugs is formed from said component material, and said at least one tab is formed from said component material.

16. The rotary machine of claim 11, wherein each of said separable plugs is decoupleable from said outer wall in response to said exterior surface reaching a threshold temperature, such that said at least one internal void is placed in flow communication with said exterior surface.

17. The rotary machine of claim 11, wherein each of said separable plugs extends from a first end adjacent said exterior surface to a second end adjacent said interior surface, said first end is flush with said exterior surface.

18. The rotary machine of claim 11, wherein each of said separable plugs extends from a first end adjacent said exterior surface to a second end adjacent said interior surface, said at least one tab extends from said first end toward said second end.

19. The rotary machine of claim 11, wherein a combined circumferential width of said at least one tab associated with each of said separable plugs is within a range of about one-eighth to one-half said circumference of said corresponding opening.

20. The component of claim 2, wherein each said opening defines a circumference, and wherein said at least one tab associated with each of said separable plugs extends around less than an entirety of said circumference.

* * * * *